US012124956B2

(12) United States Patent
Lehr et al.

(10) Patent No.: US 12,124,956 B2
(45) **Date of Patent: *Oct. 22, 2024**

(54) SYSTEMS AND PROCESSES FOR BIAS REMOVAL IN A PREDICTIVE PERFORMANCE MODEL

(71) Applicant: Cangrade, Inc., Cambridge, MA (US)

(72) Inventors: Steven Lehr, Cambridge, MA (US); Gershon Goren, Cambridge, MA (US); Liana Epstein, Cambridge, MA (US)

(73) Assignee: Cangrade, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,875

(22) Filed: Jul. 7, 2023

(65) Prior Publication Data

US 2023/0351182 A1 Nov. 2, 2023

Related U.S. Application Data

(63) Continuation of application No. 17/875,900, filed on Jul. 28, 2022, now Pat. No. 11,734,566, which is a continuation of application No. 16/749,954, filed on Jan. 22, 2020, now Pat. No. 11,429,859, which is a continuation-in-part of application No. 15/236,568, filed on Aug. 15, 2016, now abandoned.

(51) Int. Cl.

*G06N 3/08* (2023.01)
*G06Q 10/06* (2023.01)
*G06Q 10/0639* (2023.01)

(52) U.S. Cl.

CPC ..... *G06N 3/08* (2013.01); *G05B 2219/33044* (2013.01); *G06Q 10/06398* (2013.01)

(58) Field of Classification Search

CPC ........... G06N 3/08; G05B 2219/33044; G06Q 10/06398
USPC ......................................... 706/25, 15, 16, 21
See application file for complete search history.

(56) References Cited

U.S. PATENT DOCUMENTS

| | | | | |
|---|---|---|---|---|
| 10,996,160 | B2 * | 5/2021 | Chalumuri ....... | G05B 19/41875 |
| 11,521,077 | B1 | 12/2022 | Kapoor et al. | |
| 2005/0046584 | A1 | 3/2005 | Breed | |
| 2014/0122355 | A1 | 5/2014 | Hardtke et al. | |

(Continued)

OTHER PUBLICATIONS

Non-Final Office Action for U.S. Appl. No. 18/345,712, dated Mar. 14, 2024, 9 Pages.

(Continued)

*Primary Examiner* — Thjuan K Addy
(74) *Attorney, Agent, or Firm* — Morris, Manning & Martin, LLP; Adam J. Thompson, Esq.

(57) ABSTRACT

A hardware processor can receive a set of input data individually describing a particular asset associated with an entity. The hardware processor can receive a set of inputs individually responsive to a respective subset of a plurality of queries for a particular user. The hardware processor can generate a predictive model based on the set of input data. The hardware processor can calculate a predictive outcome for the particular user by applying the predictive model to the set of inputs. The hardware processor can identify a target score impacting the predictive outcome for the particular user. The hardware processor can assign a training program to the particular user corresponding to the target score.

20 Claims, 16 Drawing Sheets

(56) References Cited

U.S. PATENT DOCUMENTS

| | | | |
|---|---|---|---|
| 2015/0379454 | A1 | 12/2015 | Polli et al. |
| 2016/0196534 | A1 | 7/2016 | Jarrett et al. |
| 2016/0203432 | A1 | 7/2016 | Shaw et al. |

OTHER PUBLICATIONS

Notice of Allowance for U.S. Appl. No. 18/345,712 dated Jun. 26, 2024, 5 pages.

* cited by examiner

Competency Details

Soft and interpersonal Skills

Interpersonal Skill Levels

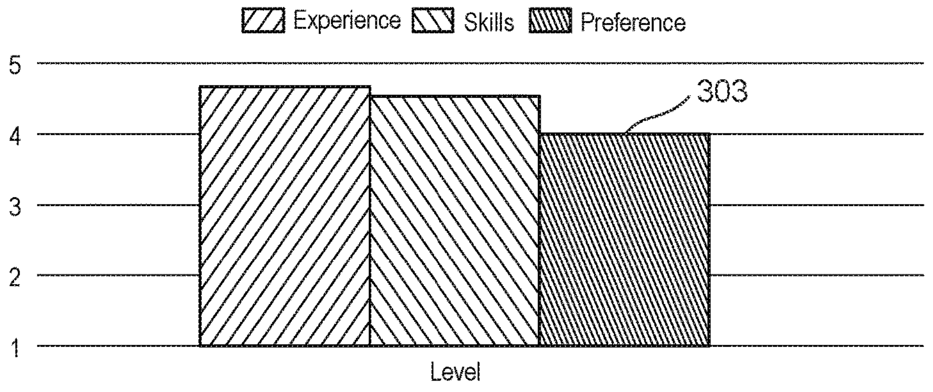

Soft and interpersonal Skills Details

| Competency | Experience | Skills | Preference |
|---|---|---|---|
| Leadership | High | High | High |
| Working in professional teams | High | High | High |
| Customer service | High | High | High |
| Working with difficult people and personalities | High | High | High |
| Simplifying complex Concepts | High | Moderate | High |
| Juggling many different responsibilities | High | High | High |
| Time management | High | High | High |
| Complex problem solving | High | High | High |

Personality Details

403 409

| Trait name | Trait Description | Level |
|---|---|---|
| Grit | Grit is the tendency to be oriented towards and dedicated to challenging goals. | 79 |
| Emotional Regulation | Emotional Regulation is a person's tendency to manage and adjust for their own and others' emotional needs. | 78 |
| Dedication | Dedication is the desire to make oneself stand out through hard work. | 76 |
| Outer Attention | Outer Attention is a person's tendency to pay close attention to the cues and the non-verbal communication of others. | 74 |
| Mastery Orientation | Mastery Orientation is the tendency to be motivated by the desire to learn new things and master skills. | 74 |
| Multitasking | Multitasking is the tendency to pursue multiple goals or complete multiple tasks simultaneously. | 73 |
| Confidence | Confidence is the tendency to perceive oneself as generally likeable and competent, and also to expect positive outcomes in the feture | 72 |
| Preference for Teamwork | Preference for Teamwork is the tendency for a person to perform well and enjoy working with groups or teams | 72 |
| Warmth | Warmth is the tendency for a person to be polite, approachable and empathetic towards others. | 59 |
| Relationship-Orientation | Relationship-Orientation is a person's tendency to value customers, collaborative environments and long-term relationships. | 56 |
| Self-Presentation | Self-Presentation is the degree to which people tend to present themselves in an extremely positive (even idealized) light. | 46 |
| Desire to Lead | Desire to Lead is the motivation to influence individuals or groups. | 53 |

FIG. 4

Clinical Specialist Assessment

[Back]

So far 2 out of 141 questions have been answered.

Task Progress: [____]

[0] minutes

This task does not have a time limit, but we suggest that you still keep track of the time spent. learn more

Your Skills and Experience

For each of the following tasks, please indicate hoe much experience you have doing this in your work, how much expertise you've built, and how think you'd enjoy doing each in your future work.

Note: if selected for an interview, you will be asked about your expertise and experience in the same skills that you are self-assising in this survey..

Working with difficult people and personalities

⊘ How much experience do you have doing this?  [3-5 years]

⊘ How much skill/experience have you built in this area?  [Advanced beginner] — 803

○ How much would you enjoy doing this regularly in your job?  [Unanswered]

Prospecting for new business

○ How much experience do you have doing this?  [Unanswered]

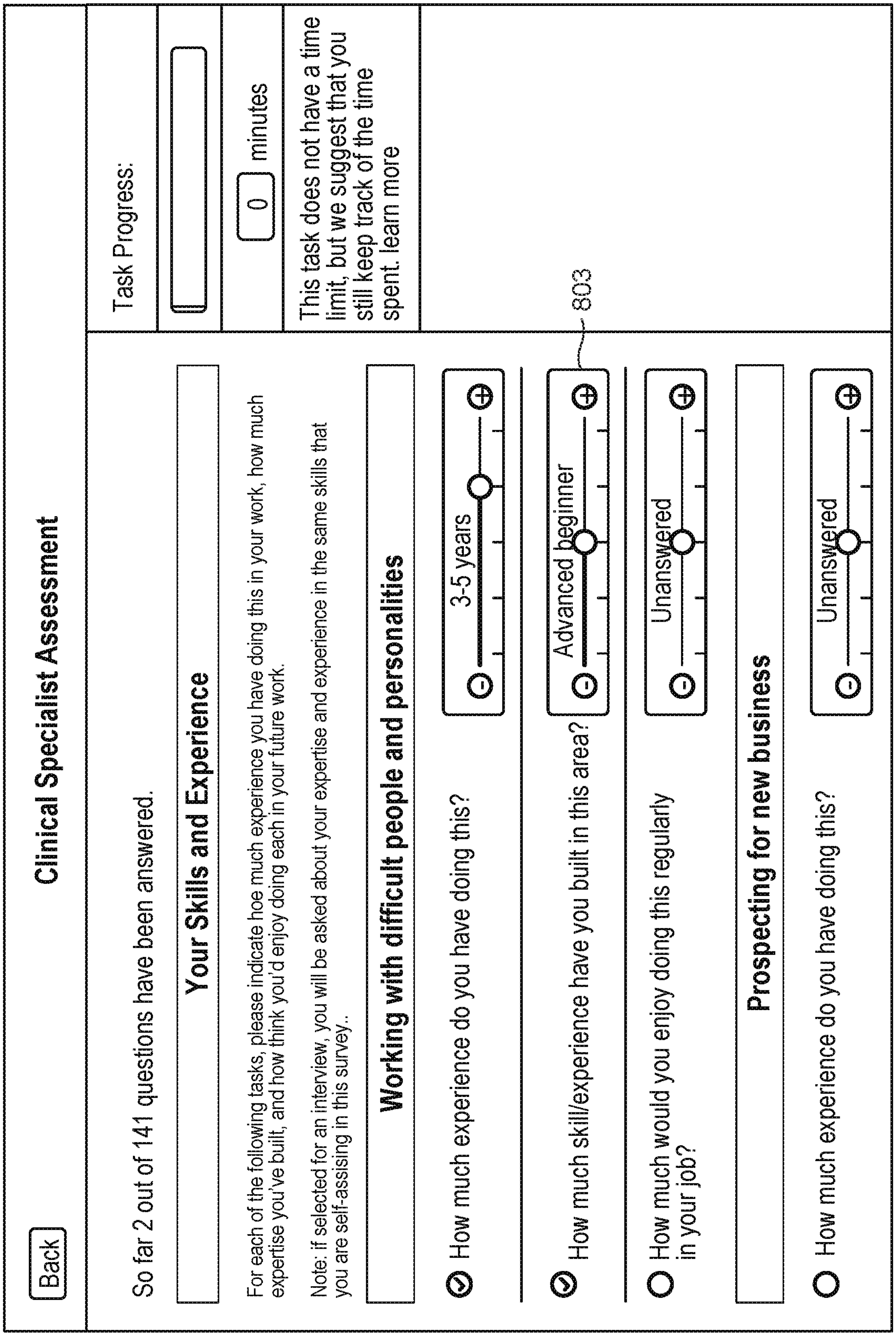

```
{
  "models":[
    {
      "coefficients":{
        "agree.abc_07_leadership_exx":0.021,
        "abc_13_networking_exx":0.205,
        "abc_17_prospecting_enj":0.297,
        "abc_17_prospecting_exx":-0.267,
        "abc_21_negotiation_enj":-0.188,
        "abc_27_data_enj":2.07,
        "ded":1.959,
        "ded.abc_27_data_enj":-0.498,
        "ereg_disp.abc_14_salesstrategy_enj":0.062,
        "mastery.abc_06_teamwork_enj":-0.037,
        "resilient_disp.abc_18_busstrategy_enj":-0.042,
        "sd.abc_10_problemsolving_enj":0.023,
        "team_disp.abc_15_metrics_enj":-0.034
      },
      "intercept":-6.107,
      "mean":2.177340465,
      "name":"Review",
      "sd":0.365830646,
      "weight":0.15
    },
      {
      "coefficients":{
        "abc_10_problemsolving_exx":0.089,
        "abc_11_jugglingresponsibilities_enj":-0.162,
        "abc_16_competitiveresearch_exx":-0.137,
        "abc_20_budgeting_exx":0.105,
        "abc_24_patientfocusedcare_exx":-0.097,
        "ded":0.196,
        "eiqouter.abc_27_data_enj":-0.037,
        "grit.abc_24_patientfocusedcare_enj":0.029
      },
      "intercept":0.89,
      "mean":1.022899399,
      "name":"Sales",
      "sd":0.293314029,
      "weight":0.15
    },
    {
      "coefficients":{
        "abc_clinical_enj": 4,
        "abc_clinical_exp": 4,
        "abc_clinical_skl": 4,
        "abc_personal_enj": 8,
        "abc_personal_exp": 8,
        "abc_personal_skl": 8,
        "abc_sales_enj": 9,
        "abc_sales_exp": 9,
        "abc_sales_skl": 9,
        "abc_technical_enj": 5,
        "abc_technical_exp": 5,
        "abc_technical_skl": 5
      },
      "intercept":0,
      "mean":285.7368,
      "name":"Skills",
      "sd":43.44217,
      "weight":0.25
    }
  ]
}
```

SYSTEMS AND PROCESSES FOR BIAS REMOVAL IN A PREDICTIVE PERFORMANCE MODEL

CROSS REFERENCE TO RELATED APPLICATIONS

This application is a continuation of U.S. patent application Ser. No. 17/875,900, filed Jul. 28, 2022 and entitled "SYSTEMS AND PROCESSES FOR BIAS REMOVAL IN A PREDICTIVE PERFORMANCE MODEL," which is a continuation of U.S. patent application Ser. No. 16/749,954, now U.S. Pat. No. 11,429,859, filed Jan. 22, 2020 and entitled "SYSTEMS AND PROCESSES FOR BIAS REMOVAL IN A PREDICTIVE PERFORMANCE MODEL," which is a continuation-in-part of U.S. patent application Ser. No. 15/236,568, filed Aug. 15, 2016 and entitled "SYSTEMS AND METHODS OF PREDICTING FIT FOR A JOB POSITION," which are incorporated herein by reference as if set forth in their entireties.

BACKGROUND

Predictive models can exclude, as an input thereto, protected data that may be illegal or unethical for use in computing and predicting outcomes or classifications. However, unprotected data input to a model may still have a biased output thereof with respect to the excluded, protected data. Previous approaches to predictive performance modeling fail to detect and exclude variables (containing only non-protected data) that may unethically or illegally bias outputs of the model with respect to protected data. For example, initial inputs put into to a machine or deep learning system may be individually unbiased, but undesirable or unethical differences may be introduced over the course of a machine process. This may occur (for example) in variable combinations during a recursive analysis, in hidden layers of a neural network, or in specific nodes of a decision tree.

In one example, a predictive performance model generates a set of predicted outcomes. In the same example, input data used by the predictive performance model is absent protected data, including data related to a single or paired status of each of the potential users. In the same example, the set of predicted outcomes may demonstrates bias (e.g., higher likelihood outcomes) towards potential users who are single over potential users who are paired. Thus, despite excluding protected data that typically serves as a source of bias, the predictive performance model still generated potentially illegal and/or biased outcomes. Therefore, there exists a long-felt, but unmet need for a system or process for bias removal in predictive performance models.

BRIEF SUMMARY

According to a first aspect, a system including: A) a memory device; and B) at least one hardware processor coupled to the memory device, wherein the at least one hardware processor is configured to at least: 1) receive input data describing a plurality of assets associated with an entity; 2) receive a plurality of inputs responsive to a subset of a plurality of queries of the user; 3) generate an artificial intelligence neural network predictive of performance based at least in part on the input data and the plurality of inputs; 4) determine that a validity value for the artificial intelligence neural network meets a validity threshold; 5) responsive to determining that the validity threshold for the artificial intelligence neural network meets the validity threshold, compute a predictive bias of the artificial intelligence neural network associated with at least one non-factored inputs; 6) in response to the predictive bias of the artificial intelligence neural network exceeding a bias threshold, score a plurality of nodes of the artificial intelligence neural network according to an effect on the predictive bias; 7) store a rule preventing a combination of parameters associated with a highest scored node of the artificial intelligence neural network; 8) generate a second artificial intelligence neural network predictive of performance based at least in part on the input data, the plurality of inputs, and the rule.

According to a second aspect, a system including: A) a memory device; and B) at least one hardware processor coupled to the memory device, wherein the at least one hardware processor is configured to at least: 1) generate predictive model data including a plurality of compartmentalized variables; 2) analyze the predictive model data to determine a plurality of bias values individually corresponding to a respective one of a plurality of protected data types; 3) determine that the at least one of the plurality of bias values violates a bias threshold corresponding to the respective one of the plurality of protected data types; 4) determine a respective contribution for each of the compartmentalized variables on the at least one of the plurality of bias values; 5) identify a particular compartmentalized variable of the plurality of compartmentalized variables based on the respective contribution each of the plurality of compartmentalized variables; and 6) generate second predictive model data including a plurality of second compartmentalized variables, the plurality of second compartmentalized variables excluding the particular compartmentalized variable.

According to a third aspect, the system of the second aspect or any other aspect, wherein the hardware processor is further configured to generate a predictive model based on the second predictive model.

According to a fourth aspect, the system of the second aspect or any other aspect, wherein the hardware processor is further configured to identify the particular compartmentalized variable by ranking the plurality of compartmentalized variables according to the respective contributions.

According to a fifth aspect, the system of the second aspect or any other aspect, wherein the hardware processor is further configured to: A) analyze the second predictive model data to determine a plurality of second bias values individually corresponding to a respective one of a plurality of protected data types; B) determine that each of the plurality of bias values does not violate the bias threshold; C) in response to determining that the plurality of bias values does not violate the bias threshold, compute a value of a fit of a user based at least in part on the second predictive model data.

According to a sixth aspect, the system of the second aspect or any other aspect, wherein the hardware processor is further configured to: A) analyze the second predictive model data to determine a plurality of second bias values individually corresponding to a respective one of the plurality of protected data types; B) determine that the at least one of the plurality of second bias values violates the bias threshold; C) identify a second particular compartmentalized variable of the plurality of second compartmentalized variables; and D) generate third predictive model data including a plurality of third compartmentalized variables, the plurality of third compartmentalized variables excluding the particular compartmentalized variable and the second compartmentalized variable.

According to a seventh aspect, the system of the second aspect or any other aspect, wherein the hardware processor is further configured to determine a validity value of a predictive model corresponding to the predictive model data, wherein the plurality of second bias values are determined responsive to the validity value not violating a validity threshold.

According to an eighth aspect, a process including: A) receiving input data describing a plurality of assets associated with an entity; B) receiving a plurality of inputs responsive to a subset of a plurality of queries of the user; C) generating an artificial intelligence neural network predictive of performance based at least in part on the input data and the plurality of inputs; D) determining that a validity threshold for the artificial intelligence neural network meets a validity threshold; E) responsive to determining that the validity threshold for the artificial intelligence neural network meets the validity threshold, computing a predictive bias of the artificial intelligence neural network associated with at least one non-factored inputs; F) in response to the predictive bias of the artificial intelligence neural network exceeding a bias threshold, computing a score each node of a plurality of nodes of the artificial intelligence neural network according to an effect on the predictive bias; G) storing a rule preventing a combination of parameters associated with a highest scored node of the artificial intelligence neural network; H) generating a second artificial intelligence neural network predictive of performance based at least in part on the input data, the plurality of inputs, and the rule.

According to a ninth aspect, a process including: A) generating predictive model data including a plurality of compartmentalized variables; B) analyzing the predictive model data to determine a plurality of bias values individually corresponding to a respective one of a plurality of protected data types; C) determining that the at least one of the plurality of bias values violates a bias threshold corresponding to the respective one of the plurality of protected data types; D) determining a respective contribution for each of the compartmentalized variables on the at least one of the plurality of bias values; E) identifying a particular compartmentalized variable of the plurality of compartmentalized variables based on the respective contribution each of the plurality of compartmentalized variables; and F) generating second predictive model data including a plurality of second compartmentalized variables, the plurality of second compartmentalized variables excluding the particular compartmentalized variable.

According to a tenth aspect, the process of the ninth aspect or any other aspect, further including generating a predictive model based on the second predictive model.

According to an eleventh aspect, the process of the ninth aspect or any other aspect, wherein identifying the particular compartmentalized variable includes ranking the plurality of compartmentalized variables according to the respective contributions.

According to a twelfth aspect, the process of the ninth aspect or any other aspect, further including: A) analyzing the second predictive model data to determine a plurality of second bias values individually corresponding to a respective one of a plurality of protected data types; B) determining that each of the plurality of bias values does not violate the bias threshold; C) in response to determining that the plurality of bias values does not violate the bias threshold, computing a value of a fit of a user based at least in part on the second predictive model data.

According to a thirteenth aspect, the process of the ninth aspect or any other aspect, further including: A) analyzing the second predictive model data to determine a plurality of second bias values individually corresponding to a respective one of the plurality of protected data types; B) determining that the at least one of the plurality of second bias values violates the bias threshold; C) identifying a second particular compartmentalized variable of the plurality of second compartmentalized variables; and D) generating third predictive model data including a plurality of third compartmentalized variables, the plurality of third compartmentalized variables excluding the particular compartmentalized variable and the second compartmentalized variable.

According to a fourteenth aspect, the process of the ninth aspect or any other aspect, further including determining a validity value of a predictive model corresponding to the predictive model data, wherein the plurality of second bias values are determined responsive to the validity value not violating a validity threshold.

According to a fifteenth aspect, a non-transitory computer-readable medium embodying a program that, when executed by at least one computing device, causes the at least one computing device to at least: A) generate predictive model data including a plurality of compartmentalized variables; B) analyze the predictive model data to determine a plurality of bias values individually corresponding to a respective one of a plurality of protected data types; C) determine that the at least one of the plurality of bias values violates a bias threshold corresponding to the respective one of the plurality of protected data types; D) determine a respective contribution for each of the compartmentalized variables on the at least one of the plurality of bias values; E) identify a particular compartmentalized variable of the plurality of compartmentalized variables based on the respective contribution each of the plurality of compartmentalized variables; and F) generate second predictive model data including a plurality of second compartmentalized variables, the plurality of second compartmentalized variables excluding the particular compartmentalized variable.

According to a sixteenth aspect, the non-transitory computer-readable medium of the fifteenth aspect or any other aspect, wherein the program further causes the at least one computing device to at least generate a predictive model based on the second predictive model.

According to a seventeenth aspect, the non-transitory computer-readable medium of the fifteenth aspect or any other aspect, wherein the program further causes the at least one computing device to identify the particular compartmentalized variable by ranking the plurality of compartmentalized variables according to the respective contributions.

According to an eighteenth aspect, the non-transitory computer-readable medium of the fifteenth aspect or any other aspect, wherein the program further causes the at least one computing device to at least: A) analyze the second predictive model data to determine a plurality of second bias values individually corresponding to a respective one of a plurality of protected data types; B) determine that each of the plurality of bias values does not violate the bias threshold; C) in response to determining that the plurality of bias values does not violate the bias threshold, compute a value of a fit of a user based at least in part on the second predictive model data.

According to a nineteenth aspect, the non-transitory computer-readable medium of the fifteenth aspect or any other aspect, wherein the program further causes the at least one computing device to at least: A) analyze the second predictive model data to determine a plurality of second bias values individually corresponding to a respective one of the plurality of protected data types; B) determine that the at least one of the plurality of second bias values violates the bias threshold; C) identify a second particular compartmentalized variable of the plurality of second compartmentalized variables; and D) generate third predictive model data including a plurality of third compartmentalized variables, the plurality of third compartmentalized variables excluding the particular compartmentalized variable and the second compartmentalized variable.

According to a twentieth aspect, the non-transitory computer-readable medium of the fifteenth aspect or any other aspect, wherein the program further causes the at least one computing device to at least determine a validity value of a predictive model corresponding to the predictive model data, wherein the plurality of second bias values are determined responsive to the validity value not violating a validity threshold.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a pictorial diagram of an example user interface rendered by a client device in the performance analytics system of FIG. 1 showing an assessment report according to various embodiments of the present disclosure.

FIG. 4 is a pictorial diagram of another example user interface rendered by a client device in the performance analytics system of FIG. 1 showing an assessment report according to various embodiments of the present disclosure.

FIG. 8 is a pictorial diagram of another example user interface rendered by a client device in the performance analytics system of FIG. 1 according to various embodiments of the present disclosure.

FIG. 11 is an example performance analytics model according to various embodiments of the present disclosure.

DETAILED DESCRIPTION

Figure 1:
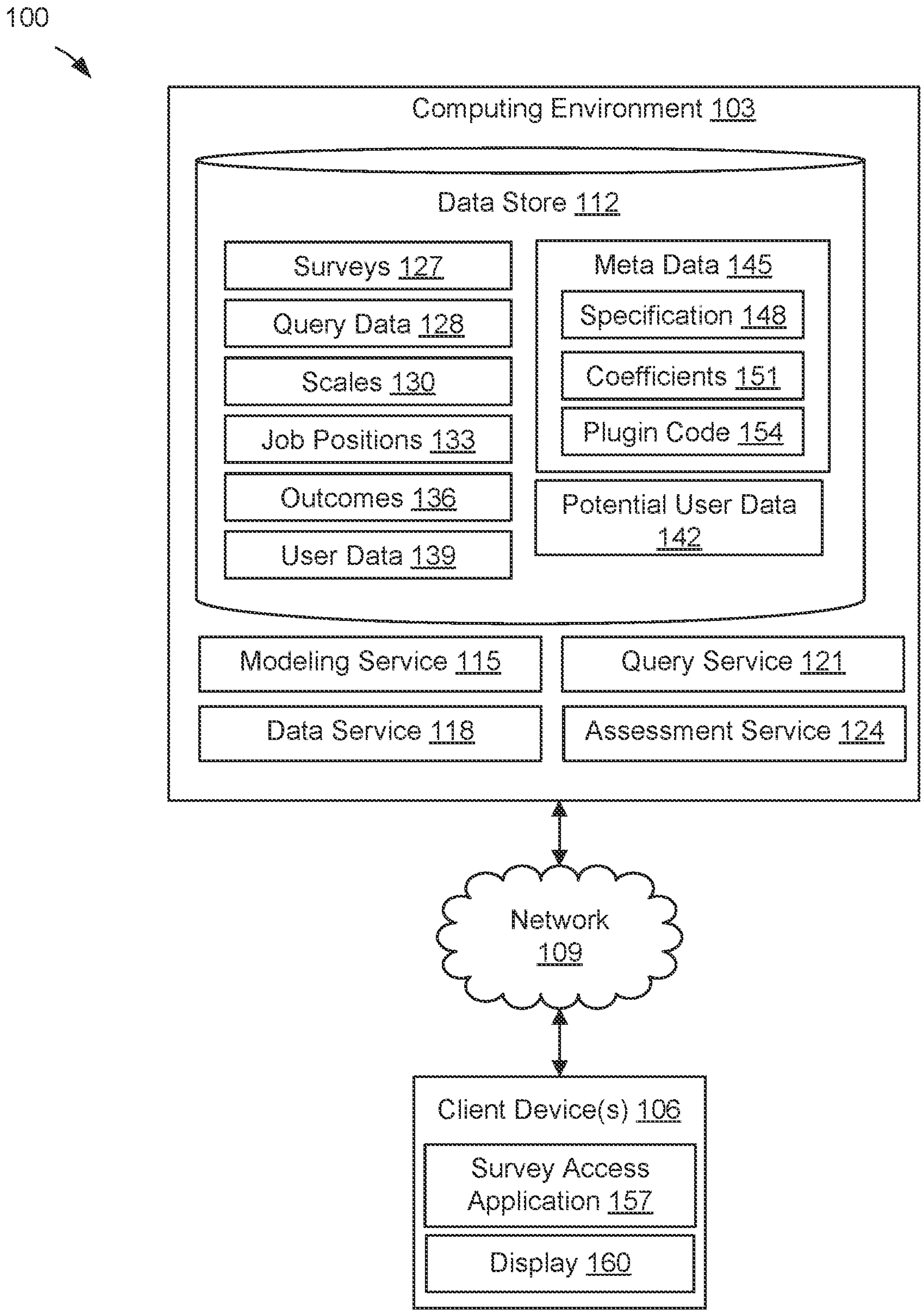
FIG. 1 is a drawing of a performance analytics system according to various embodiments of the present disclosure.

The present disclosure relates to a performance analytics system. A performance analytics system can use predictive analytics, intuitive user interfaces, and data integrations to allow recruiters and user managers (such as hiring managers) to select and/or admit potential users more quickly and with greater confidence that the potential user will be an adequate fit for a particular job.

Generally, the performance analytics system can evaluate potential users based on a variety of inputs. The performance analytics system can evaluate by applying artificial intelligence and machine learning onto one or more inputs and outcomes to generate a performance analytics model. The performance analytics system can determine whether the performance analytics model is biased with respect to one or more protected data. If so, the performance analytics system can modify one or more nodes or aspects of a neural network, referred to as compartments, to identify a compartment that contributes most to the bias in the model. Another neural network can be generated that excludes the identified compartment and any previously excluded compartments.

One of the inputs can be selections responsive to queries. As such, potential user responses to queries can be evaluated based on responses from users to the same queries, and, for example, performance and work histories for those users, among other inputs. Accordingly, the performance analytics system can generate a list of potential users, and identify a best fit between a potential user and a job position. A "best fit" can be determined, for example, by a prediction based on the performance analytics system performing a regression analysis on various quantitative inputs. The term "best fit" can refer to a potential user having a highest predicted score, a job position with which the potential user scores the highest predicted score, or other evaluation of a potential user's fit for a job position.

More specifically, the performance analytics system can include services, which can process and organize inputs (such as user responses) to queries, in combination with performance data, to create scales and/or generate weights for pre-existing scales. The performance analytics system can also analyze the inputs and scales to generate a predictive model. The predictive model can include one or more predictive modeling techniques including, but not limited to, machine learning and/or artificial intelligence (AI) techniques, statistical regression techniques, recursive regression techniques, neural networks, decision trees, and other predictive modeling processes. In at least one embodiment, the predictive model is an artificial neural nodal network and the variables thereof are nodes (e.g., and can include composite nodes and hidden nodes). According to one embodiment, a process described herein (such as, for example, the process 1300, 1400, or 1500) can be performed in parallel. In one example, the process can be performed in one iteration using a particular technique (such as neural networks) and can be performed in a second iteration using another technique (such as recursive regression). In another embodiment, two or more iterations can be performed in parallel using the same technique but excluding different identified compartmentalized variables. In one or more embodiments, the outputs of predictive models generated using each process iteration can be compared such that a best performing iteration of the final predictive model can be determined and used to generate a set of final predicted outcomes. In some embodiments, the technique or techniques used can be selected based on a size of data to be analyzed. For example, recursive regression may be used when a size of the dataset falls below a threshold, while neural networks can be used when the size of the dataset meets or exceeds the threshold.

A query service can present queries to a potential user for a job position. The queries can be selected based on a variety of factors. In one example, queries for a potential user are based on what scales correlate to performance for a job position. A modeling service can calculate scores based on a predictive model and potential user responses to queries. An assessment service can calculate a score of a fit of a potential user. Accordingly, the assessment service can provide a list of potential users ranked by score. In at least one embodiment, ideal job positions can be predicted for users and potential users based on responses to standardized queries provided to all or a subset of users associated with an entity. For example, all users from an entity can provide input responsive to a set of standardized queries, the users occupying a plurality of job positions of the entity. In the same example, a model of most ideal users for each of the plurality of job positions can be generated by generating predictive models based on the input. Continuing the same example, a plurality of potential users can provide input responsive to the set of standardized queries. In the same example, a plurality of ideal job position predictions can be generated by the predictive model based on the potential user input.

As described herein, a user can be a potential user in various instances (e.g., if the user is being considered for a different position with their corresponding entity). It is understood that, in one or more embodiments, a user can be an agent or a job candidate for a job position, amongst others. Additionally, in at least one embodiment, a job candidate can be a user of an entity (e.g., such as a corporation). Further, in various embodiments, the terms potential user, and/or candidate can be used to refer to a previous, current, and/or user, or any other person. According to one embodiment, when specifying either a potential user or a user herein, the same functionality can be performed with respect to an agent or a candidate, respectively. As such, in various embodiments, the usage of the terms user and potential user, are not meant to be limiting.

As used herein, "protected data" generally refers to data associated with one or more protected categories. The one or more protected categories can include, but are not limited to: 1) race (or skin color); 2) age; 3) ethnicity; 4) sex; 5) gender; 6) political affiliation; 7) religion; 8) pregnancy; 9) disability; 10) military service; 11) criminal history; 12) sexual orientation; 13) national origin; 14) genetic information; 15) family status; 16) physical traits (e.g., height, weight, etc.); 17) marital status; and 18) pecuniary information. The present systems and processes can include a protected data definition that defines a subset of the one or more protected categories and, thus, defines data that is "protected." In other words, the protected data definition can be used to determine data that is excluded from input to predictive models described herein. The protected data definition can be configured automatically or manually (for example, via inputs received from an entity).

With reference to FIG. 1, shown is a performance analytics system 100 according to various embodiments. The performance analytics system 100 includes a computing environment 103 and one or more client device 106, which are in data communication with each other via a network 109. Various applications and/or functionality may be executed in the computing environment 103 according to various embodiments. The applications executed on the computing environment 103 include a modeling service 115, a data service 118, a query service 121, an assessment service 124, and other applications, services, processes, systems, engines, or functionality not discussed in detail herein. Also, various data can be stored in a data store 112 that is accessible to the computing environment 103. The data store 112 may be representative of multiple data stores 112 as can be appreciated.

The data store 112 can store data including, but not limited to: 1) field data, for example, information describing a class of entities; 2) entity data, for example, information describing entity objectives, architecture, and resources; 3) organization data; 4) user data; 5) position data, for example, job information, job opening data, etc.; 6) models and model data (and metadata thereof); 7) coefficients and coefficient data (and metadata thereof); and 8) other analytics data, as can be fully appreciated based on the disclosure contained herein. The data stored in the data store 112 includes, for example, analyses 127, query data 128, scales 130, job positions 133, outcomes 136, user data 139, potential user data 142, and potentially other data. The scales 130 can include a value evaluating a skill, trait, attribute, competency, attribute of a job position 133, attribute of an entity, or other aspect of a user. Several example scales 130 include "Quantitative," "Resourceful," "Social," "Organized," "Stressful," "Self Starting," "Broad Thinking," "Trust," "Confidence," "Precision," Organization," and other scales. The query data 128 can include queries for evaluating a skill, trait, attribute, competency, attribute of a job position of an entity, or other aspect of a user. The query data 128 can also include permissible and/or previously received inputs to the queries, the permissible and/or historical inputs can include potential responses to the queries. In at least one embodiment, the query data 128 includes a plurality of permissible inputs for each query, and the data store 112 includes a scale 130 for assigning a value to the object of the query (e.g., a skill, trait, etc.).

Additionally, the data store 112 can include metadata 145, which can be generated by the modeling service 115, manually entered by an administrator, or modified by the administrator. The metadata 145 can includes a specification 148, coefficients 151, and plugin code 154. The data stored in the data store 112, for example, is associated with the operation of the various applications and/or functional entities described below.

The one or more client devices 106 can be configured to execute various applications such as an analysis access application 157 and/or other applications. The analysis access application 157 can be executed in a client device 106, for example, to access network content served up by the computing environment 103 and/or other servers, thereby rendering a user interface on the display 160. To this end, the analysis access application 157 can be a browser, a smart phone application, a dedicated application, or another application. The user interface can include a network page, an application screen, or another interface. The client device 106 can be configured to execute applications beyond the analysis access application 157 such as, for example, email applications, social networking applications, word processors, spreadsheets, and/or other applications.

The client device 106 can include a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 160. The display 160 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The network 109 can include, for example, the internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Regarding operation of the various components of the performance analytics system 100, the query service 121 can present a plurality of queries based on query data 128 to a client device 106. According to one embodiment, the query service 121 organizes the plurality of queries into one or more analyses 127. The plurality of queries can include, based on query data 128, selectable input fields, selectable inputs, categorical information corresponding to each query, and other query-related information (e.g., query metadata). The categorical information can include a scale 130 that each query is intended to evaluate. Queries provided to the client device 106 can be selected for inclusion using the query service 121 and/or based on inputs providing an indication of inclusion for one or more queries.

Additionally, a data service 118 can be used to correlate and populate other data stored in the data store 112. The data service 118 can provide import, export, and data management services. Another aspect of the data service 118 is the ability to gather performance data, such as, for example, metrics representing the performance of a user in a given job position. As one example, the data service 118 can receive data describing a plurality of users. The data describing the plurality of users can be mapped to the user data 139.

The data service 118 can store data describing a particular user of the plurality of users in the user data 139. Specifically, data management services of the data service 118 can access user data fields stored outside the computing environment 103, such as organization name, architecture, user lists, user groups, usernames, user codes, user titles, salaries, start times, lengths of user activity, user reviews (e.g., reviews of a user and/or reviews provided by a user), and other suitable data. The performance data for users can be used to determine a suitability metric (e.g., a job performance metric or a job success metric, among others). The job performance metric can be a weighed value based on performance reviews of the user. The job success metric can be based on the performance reviews and various other factors, such as, for example, a personality profile of the user, length of user activity, organization information, satisfaction ratings, external reviews, progress towards job objectives, and other data. In some embodiments, the metric can change based on criteria, user selection, correlation or causation determined during generation of the predictive model, or by some other mechanism.

The query service 121 can present a plurality of queries (in some embodiments, organized into an analysis 127) to a user of a client device 106. The analysis 127 can include one or more queries (sourced from query data 128) corresponding to one or more scales 130 that relate to the user. For example, some of the queries can correspond to a "Job Engagement" scale 130 for the user. In one embodiment, the query service 121 can select queries that correspond only to specific scales 130. As an example, the query service 121 can limit the number of scales 130 that queries are selected from for a potential user based on the metadata 145 for a job position 133. In this example, the number of queries in provided to the client device 106 (e.g., in an analysis 127) can be reduced by only evaluating scales 130 with the greatest impact on the outcome 136.

The query service 121 can present a series of queries from the analysis 127. The series of queries can be provided through a single page web application. The query service 121 can receive one or more inputs and/or selections responsive to each of the series of queries to gather a set of query results. The query service 121 can provide a score for a user instantaneously upon receiving inputs indicating selections or responses to the series of queries. As an example, upon receiving input responsive to a plurality of queries, the query service 121 can use the metadata 145 to generate an outcome 136 for the user without further user interaction required. The query service 121 can present the time elapsed and a progress of the plurality of queries or a task within the plurality of queries (or an analysis 127 containing the same). Examples of task include, but are not limited to, completing a technical assignment, submitting a writing sample, providing a transcript, and uploading a cover letter, among others. In at least one embodiment, the query service 121 gathers query results from some or all users from an entity.

The query service 121 can facilitate the creation of analyses 127. Different analyses 127 can be created for different job positions 133. The query service 121 can select analyses 127 from a repository of stored analyses 127 and/or queries. The selection can be based on various factors, such as, for example, a score of how important each scale 130 is for a job position 133. In various embodiments, an entity (such as an employer) can select competencies from a pool, and the query service 121 can select one or more analyses 127 (and/or included queries) based on the entity selections. In one or more embodiments, responses to queries (whether in an analysis 127 or otherwise) can be used with different data sets to generate and train a plurality of predictive models. For example, the plurality of different predictive models can include a plurality of different types of predictive models (e.g., neural networks, recursive regression, decision tree, etc.). Thus, the system can generate predictions for a plurality of use-cases or scenarios (e.g., each use-case or scenario being at least partially determined by the data set).

The assessing service 124 can record and/or evaluate the predicted outcomes 136 to determine a success rate, such as, for example, the success rate of a predictive model that is based on queries (e.g., inputs thereto) selected by an entity. The importance of each scale 130 can be determined based on the metadata 145. The query service 121 can receive a selection of queries from the repository of stored queries through an admin user interface. By creating an analysis 127 for a particular job position 133, one or more scales 130 can be used to determine a success profile for the job by which potential users can be evaluated. The success profile can be based on personal traits, motivators, soft skills, hard skills, attributes, and other factors or scales 130.

According to one example, the query service 121 selects queries corresponding to a "Preference for Quantification" scale 130 from the plurality of queries within analyses 127. The selection of the "Preference for Quantification" scale 130 can be selected for analyses 127 to evaluate potential users. The selection of the "Preference for Quantification" scale 130 can occur in response to determining a correlation between the "Preference for Quantification" scale 130 and performance in a job position 133, such as, for example, when generating the metadata 145. The assessment service 124 can use responses to the selected queries to evaluate the "Preference for Quantification" scale 130 for a user. The modeling service 115 can use the scale 130 for the user to evaluate an importance of the "Preference for Quantification" scale 130 for a job position 133.

In one embodiment, the query service 121 can generate user interfaces to facilitate the analysis 127 of a user of a client device 106. As an example, the query service 121 can generate a web page for rendering by the analysis access application 157 on the client device 106. In another example, the query service 121 can send the queries to the analysis access application 157, and the analysis access application 157 can present the queries on the display 160.

The modeling service 115 can generate a predictive model based on various data. The modeling service 115 can store data describing the model within metadata 145. The modeling service 115 can calculate the predictive model by analyzing the user data 139 and scales 130. As such, the modeling service 115 can provide a step-wise modeling feature, a reduced step-wise modeling feature, a linear modeling feature, and other modeling features. Accordingly, the modeling service 115 can create a predictive model that can be used by the computing environment 103 to generate predictions of likely outcomes 136 for potential users. By creating a predictive model that can be used to grade potential users, a validated fit between a potential user (e.g., a candidate) and a job position can be determined based on a success profile for the potential user.

The modeling service 115 can create the metadata 145. As an example, metadata 145 can include specification 148, coefficients 151, and plugin code 154. A specification 148 includes the data elements that define a predictive model, including various constants and applicable relationships observed between data elements. A specification 148 can include a protected data definition defining a subset of one or more protected categories, the data associated with the subset being classified as protected data that are excluded from inputs to the predictive model. The modeling service 115 can create the specification 148 including a model definition, such as, for example, performance analytics model 1100 in FIG. 11. The model definition can be in any suitable format (e.g., a JSON format, other open-source XML format, or other proprietary format).

The coefficients 151 can be defined by a name and value pair. In at least one embodiment, the coefficients 151 are weight values assigned to variables (e.g., scale scores generated based on query responses and scales 130). The weight values can be used by predictive models (described herein) to quantify a variable's relative contribution to an outcome 136 (e.g., a score). For example, a variable with a higher coefficient 151 can be more heavily weighted by a predictive model than a variable with a lower coefficient 151. The coefficients 151 can individually correspond to a particular scale 130. As a non-limiting example, a coefficients 151 for scales 130 related to a particular "Engineering" job position 133 can have a name series of "Leadership," "Networking," "Documentation," "Negotiation," "Dedication," "Planning," "Teamwork," "Technical Certifications," "Problem Solving," and "Discipline." In another example, a coefficients 151 for scales 130 related to a particular job position 133 can have a name series of "Simplifying Complication," "Growth Techniques," "Physician Communication," "Computers," "Multitasking," "Competitive Research," and "Applicable Experience," or other names. Each name of a coefficient 151 can have an associated value containing a real, rational number.

Another operation of the computing environment 103 is to calculate a predicted outcome 136 for a potential user (for example, a candidate) applying for a position with an entity (for example, selection and/or admission to a job position 133 within an organization). An outcome 136 can relate to the result of the assessment service 124 applying a predictive model to a potential user. For example, the assessment service 124 can apply a predictive model to the query responses provided by the potential user to generate an outcome 136 for the potential user. In another example, the outcome 136 for a job position 133 can be determined without the potential user applying for the job position 133. In one embodiment, the potential user can be a user within the organization (or other entity). For example, responses to queries from users can be used to evaluate the users for a job position 133 after the modeling service 115 generates the metadata 145 corresponding to that job position 133. Thus one operation of the computing environment 103 can be to calculate multiple predictive outcomes 136, based on a predictive model, for a user within the organization for multiple job positions 133.

The plugin code 154 is executed by the computing environment 103 to provide certain customization features for standard and non-standard job positions 133. The plugin code 154 can be input by a user or generated by the modeling service 115. For example, certain entities or entity classes have special job positions 133 that require a customized potential user grading system. The plugin code 154 can execute custom logic when evaluating a potential user. The plugin code 154 can be executed by the assessment service 124 to modify or extend the predictive model.

The assessment service 124 can generate a score predicting a fit for a candidate in a job position 133 and can store the score as an outcome 136. The assessment service 124 can also score users (including potential users) based on a number of different inputs including metadata 145. The assessment service 124 can score users based on a user's responses to queries, in combination with a predictive model described herein, according to a specification 148 and coefficients 151. As an example, the assessment service 124 or the query service 121 can score a user on one or more scales 130 based on the user's responsive inputs to a series queries in an analysis 127 provided to a client device 106 of the user.

The assessment service 124 can determine an outcome 136 predicting a fit of the user in the job position 133 based on multiply coefficients 151 by the respective variables (e.g., scale scores) calculated from the response from the user. The assessment service 124 can determine and provide outcomes 136 for one or more users. The assessment service 124 can generate a user interface with a ranked list of job candidates ranked by scores.

In one embodiment, the client device 106 runs an analysis access application 157 to provide a mechanism for a user or potential user to read queries from a display 160. Thus, a user or potential user can use the analysis access application 157 to respond to queries selected by the query service 121. The queries responded to by the user or potential user using inputs to the analysis access application 157 can be from an analysis 127. Input responsive to the queries can be evaluated based on the metadata 145 including the specifications 148 and the coefficients 151.

For example, a candidate can provide input responsive to queries related to multiple scales 130 including "Multitasking." Thus, an outcome 136 for the candidate performance can be determined using the metadata 145.

A data service 118 can receive user data 139 describing a user associated with an entity. A query service 121 can receive input responsive to queries from the user using the analysis access application 157. A query service 121 can calculate scales 130 for the user based on the input to the queries. In one example, the scales 130 can also be based on the user data 139. The modeling service 115 can generate metadata 145 for a performance analytics model based on the scales 130 and user data 139. The query service 121 can receive potential user data 142 including responses to queries received via input from a client device 106 of a potential user. The assessment service 124 can calculate scale scores for the potential user based on the user responses. An assessment service 124 can predict an outcome 136 of a fit of the potential user based on the scale scores for the potential user and the performance analytics model.

Figure 2A:
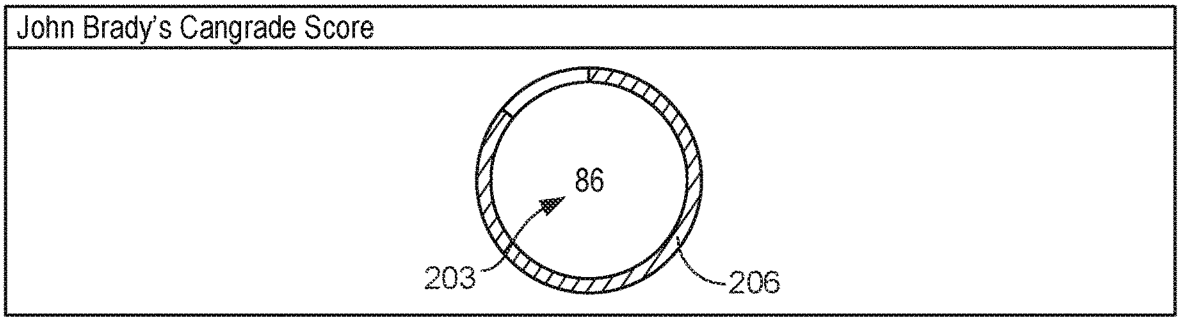
FIGS. 2A-2C are pictorial diagrams of example user interfaces rendered by a client device in the performance analytics system of FIG. 1 according to various embodiments of the present disclosure.
Figure 2B:
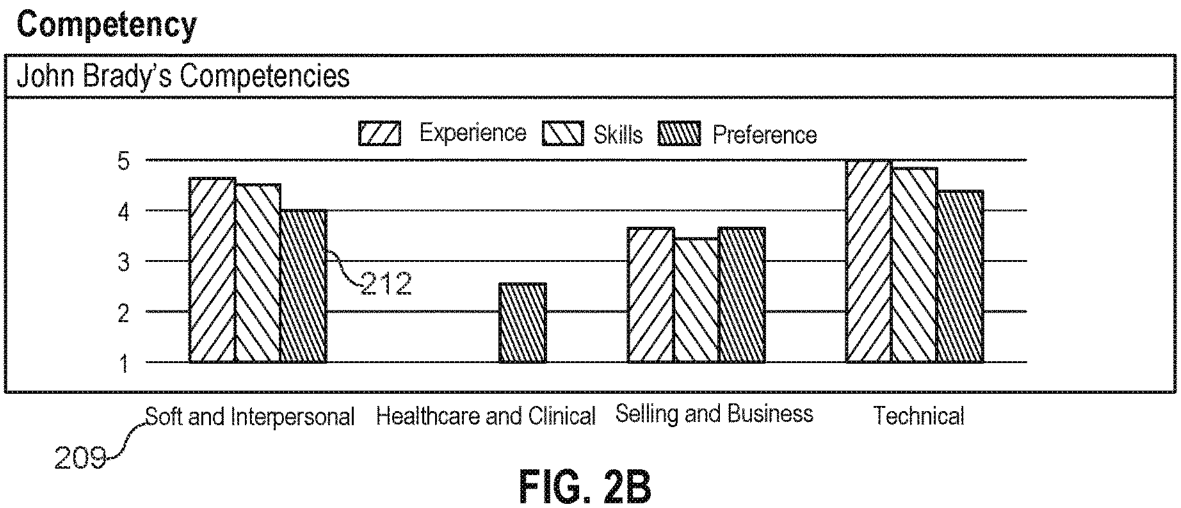
Figure 2C:
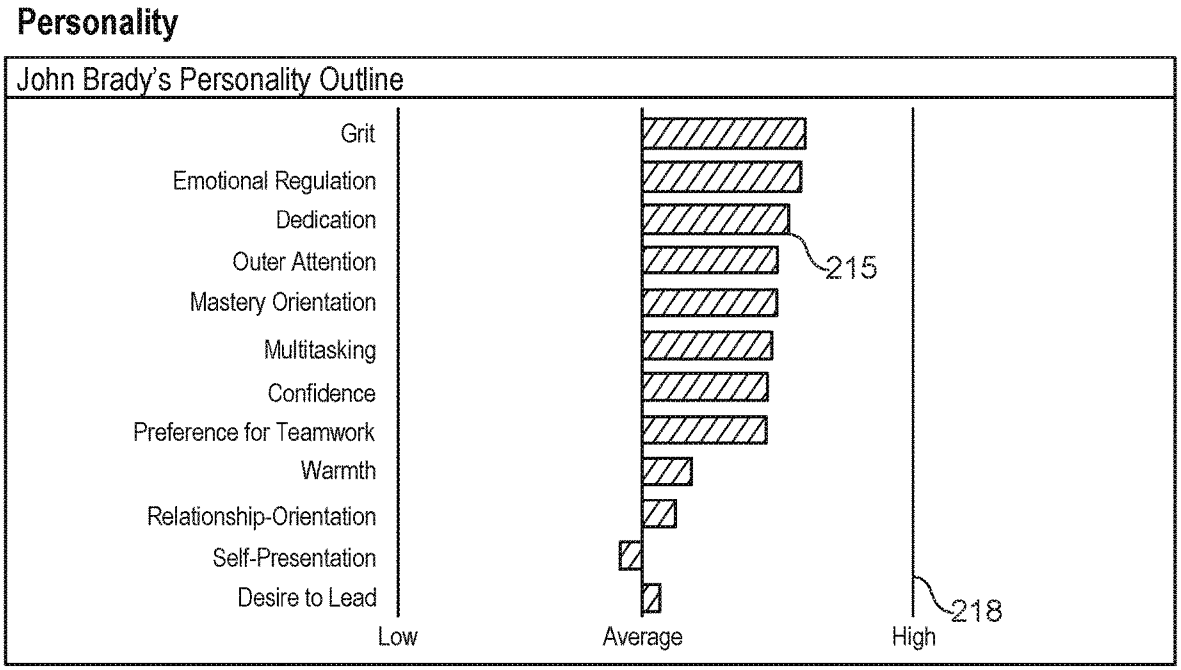

Turning now to FIGS. 2A-2C, shown are examples of user interfaces displaying a score for a potential user, such as an outcome 136. With reference first to FIG. 2A, shown is a user interface diagram displaying an example of a portion of an assessment report generated by assessment service 124 rendered on display 160. The assessment report can include a textual element 203 representing an outcome 136 (e.g., a score, in some embodiments) for a given potential user, as well as a graphical element 206 corresponding to the outcome 136. In the embodiment, the textual element displays a raw score, and the graphical element 206 displays a radial chart. In another embodiment, the textual element could be an average score, a standard deviation, or some other score. Additionally, the graphical element could be a pie chart, bar chart, histogram, or some other graphical representation.

According to one embodiment, as described herein, the potential user is a candidate for a job position. When admitting or accepting users for an entity, Human Resource (HR) departments and user managers have limited interactions with candidates to determine whether or not the candidate is an adequate fit for the entity. Entities can use software tools, such as a user selection and admission system, to assist HR departments and user managers in the selection and/or admission of candidates. These systems can make it easier to screen and hire candidates. A recruiter or user manager uses a system to gather data about candidates for use in manually matching candidates who may be an adequate fit for one or more jobs. Candidates can also be interviewed in person ensure the candidate gets along with the existing users.

However, it is difficult to predict the compatibility of a candidate with the entity based on short interactions. Personality traits of a candidate may make the candidate poorly suited for the position or likely to conflict with other users. In addition, candidates that would be extremely successful may be dismissed for selection or admission based on a missing keyword in a resume or a filtering process that is overly simplistic. Therefore, it is desirable to predict the future success of candidates in real time when evaluating candidates for a job opportunity. By predicting candidate success based on a predictive performance model, the predictions can be evaluated for validity and bias, thereby providing recruiters a process for rapidly identifying, in a statistically valid and bias reduced manner, candidates most likely to perform ideally in a particular position. Furthermore, by providing recruiters (or other users) with assessment reports and user interfaces (such as those shown in FIGS. 2A-8), predicted success candidate suitability across a variety of criteria can be quickly visualized and compared across a plurality of candidates.

With reference to FIG. 2B, shown is a user interface displaying a portion of an assessment report, this time showing a bar chart of user performance for several scales 130, with performance grouped by competency type 209 (e.g., Soft and Interpersonal). Each competency can be further broken down by the categories of Experience, Skills, and Preference, or other categories. The bar indicator 212 can represent a scale 130 of a potential user for a Preference category of the Soft and Interpersonal competency type 209, and can accordingly be used to effectively score or screen a particular potential user for a job position 133.

With reference to FIG. 2C, shown is a user interface displaying another portion of an assessment report including a personality outline screen of an assessment report, broken down by a given personality attributes of a potential user. In this embodiment, personality attributes are shown on a scale between low, average, and high. The personality attribute 215 represents a score for a "Dedication" personality attribute. In this embodiment, the personality attribute 215 can be compared to an average score, an ideal score, or some other score. The vertical indicator 218 (e.g., High) can represent a potential user's score compared to a standard deviation for that personality attribute.

Referring next to FIG. 3, shown is another user interface diagram displaying an example of a portion of an assessment report generated by assessment service 124 rendered on a display 160. In a first section of the user interface (e.g., Interpersonal Skill Levels), skill levels are plotted in a bar chart. Skill Details are presented in a section of the user interface in a list by Competency Name, along with a score for each of an Experience, a Skills, and a Preference, where the score shown may range from "Low," "Moderate," and "High." In this example, a bar indicator 303 represents a score for a potential user grouped by interpersonal skills according to user preference, on a level from one to five.

The bar indicator 303 can represent a five-point range (e.g., Likert range), some other range, or some other representation of a score. In another example, each skill can be grouped by a competency. The example of FIG. 3 shows a competency of "Complex problem solving" with user performance detailed across "Experience," "Skills," and "Preference." Here, a preference indicator 309 indicates a user preference for complex problem solving is high, which can indicate an adequate fit between a potential user and a job position 133 that includes complex problem solving. As an example, an outcome 136 can be higher for a first potential user that has a high complex problem solving in contrast to a second potential user with a low complex problem solving when a complex problem solving scale 130 correlates to performance for a job position 133.

Referring next to FIG. 4, shown is another user interface diagram displaying an example of a portion of an assessment report generated by assessment service 124. In this embodiment, a personality details report shows a table of trait names, trait descriptions, and level for a particular potential user. Thus, a name 403 for a scale 130 (e.g., Grit) can be presented near a textual value indicating the potential user's score for that scale 130 (e.g., 79). A description 406 can also be provided to help explain the given scale 130. A visual indicator 409 for an outcome 136 (for example, a scale score) can be presented corresponding with the textual value for the scale score, using a temperature gauge, a radial chart, a bar chart, or some other graphical representation of a score.

Figure 5:
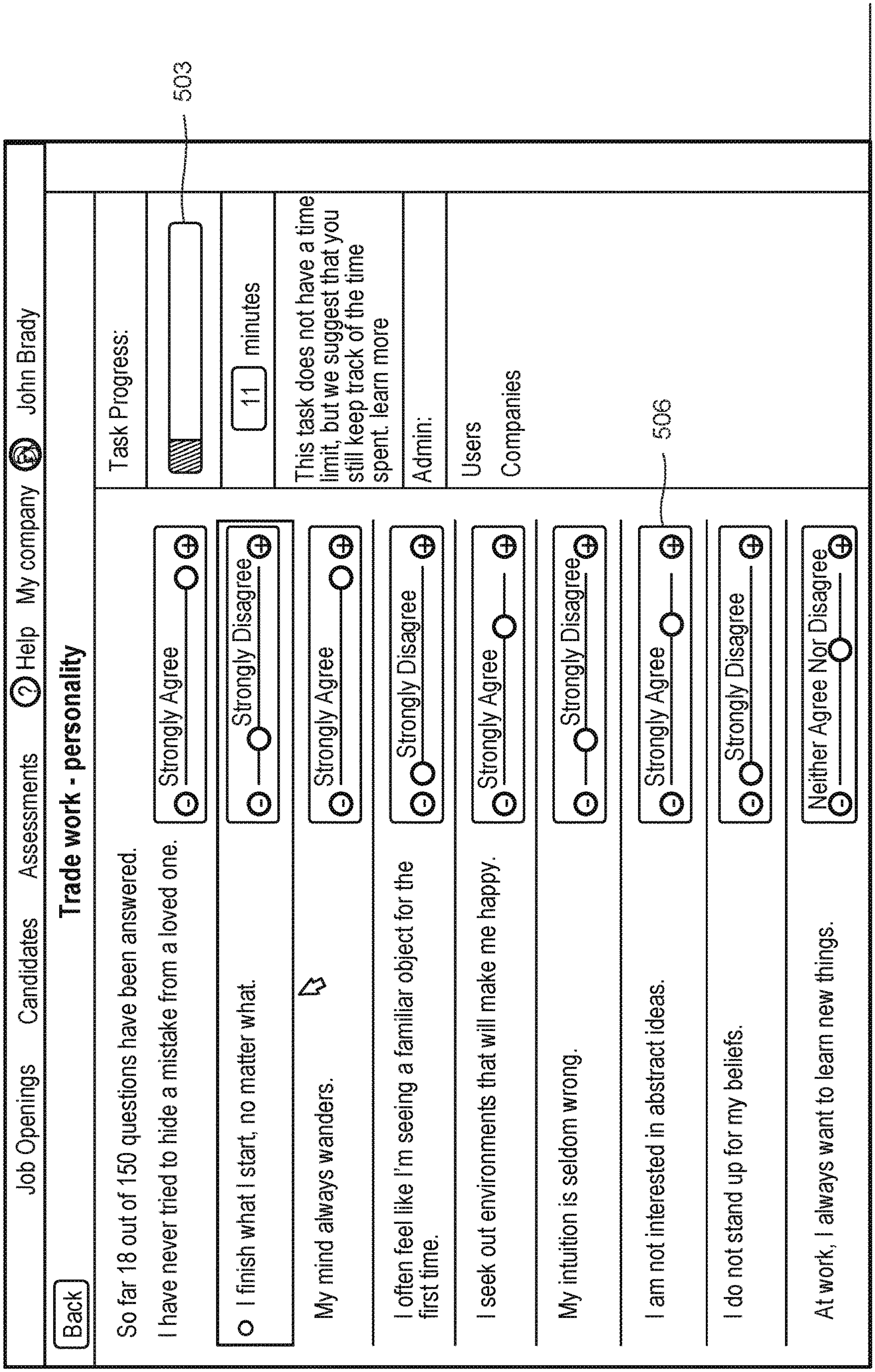
FIG. 5 is a pictorial diagram of another example user interface rendered by a client device in the performance analytics system of FIG. 1 according to various embodiments of the present disclosure.

Referring next to FIG. 5, shown is a user interface diagram displaying an example of an analysis 127 generated by a query service 121 accessed by a analysis access application 157 and rendered on display 160. Here, a potential user or user (a "client") has accessed an analysis 127 using client device 106. In this embodiment, a task progress indicator 503 shows the progress of the client through the analysis 127. The task progress indicator 503 could indicate progress based on progress through a static number of pages, or alternatively, the task progress indicator 503 could indicate progress based on input responsive to queries (e.g., an adaptive test). Queries (e.g., 150 queries) have been prepared for the client. The client can tap, press, or otherwise manipulate the user interface to provide input responsive to the queries presented. Client responses to queries are collected through analysis access application 157 and can be stored as user data 139, potential user data 142, or both. The example interface shown in FIG. 5 allows the client to provide responsive input to queries using a five-point responsive range 506 (e.g., Likert range), although the responsive range could also be a three-point range, a seven-point range, other range, or other input methods (e.g., text fields). A client can use the interface to display and navigate through an analysis 127 (e.g., using a back button to go to a previous page listing queries). Accordingly, the interface shown in FIG. 3 allows a client to start an analysis 127, select queries, provide responses to queries, navigate, and track progress. Additionally, the interface shown can also be used to collect responses from potential users or other users and subjects. According to one embodiment, the analysis 127 can be a survey, such as, for example, a survey 127 described in U.S. patent application Ser. No. 15/236,568, filed Aug. 15, 2016, which is incorporated herein by reference in its entirety. Similarly, in various embodiments: 1) the analysis access application 157 can be a survey access application, such as, for example, a survey access application 157 described in U.S. patent application Ser. No. 15/236,568; and 2) the query service 121 can be a survey service, such as, for example, a survey service 121 described in the same reference. Any incorporation by reference is not intended to give a definitive or limiting meaning of a particular term. In the case of a conflict of terms, this document governs.

Figure 6A:
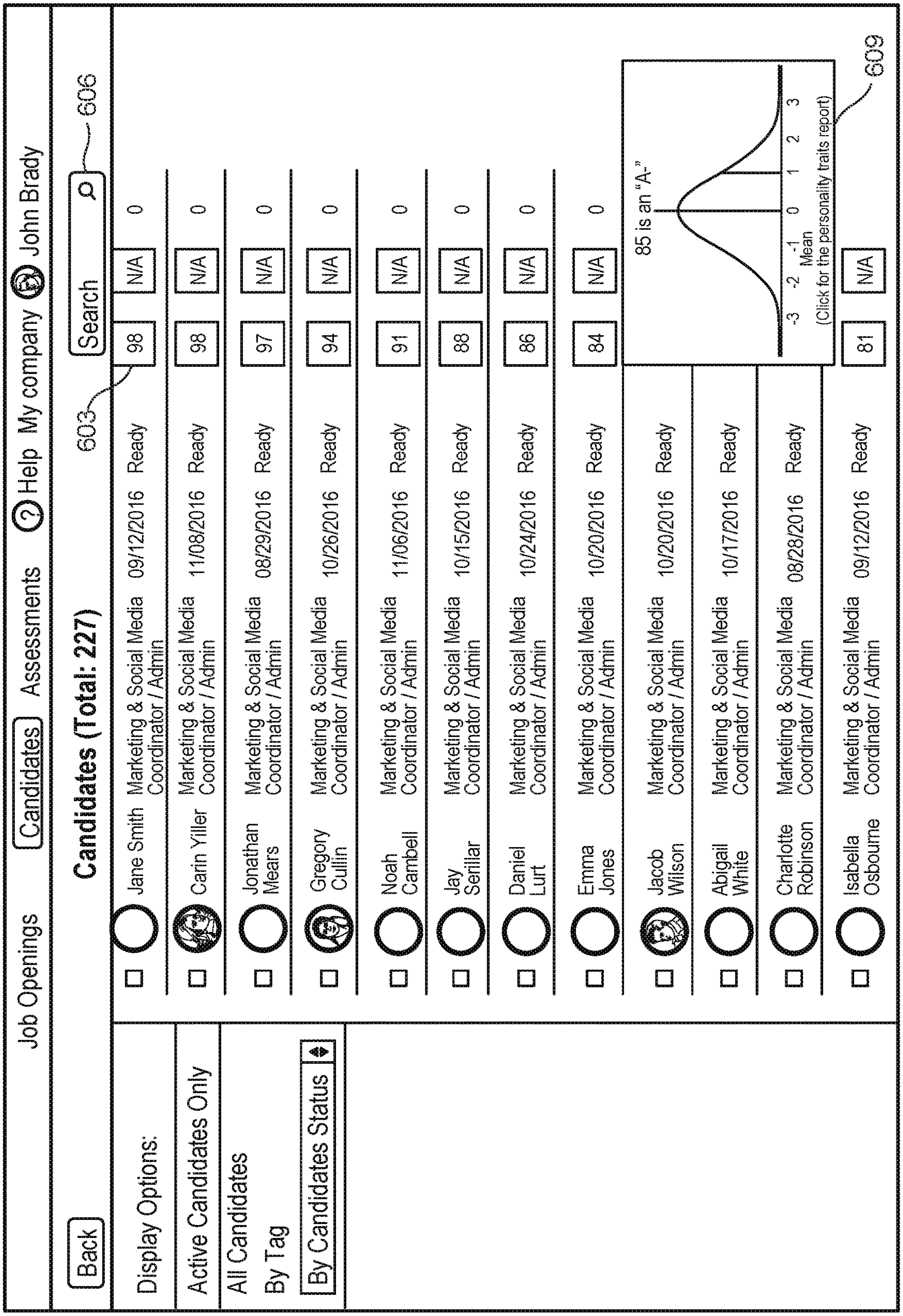
FIGS. 6A and 6B are pictorial diagrams of other example user interfaces rendered by a client device in the performance analytics system of FIG. 1 according to various embodiments of the present disclosure.

Referring to FIG. 6A, shown is a user interface diagram displaying an example of an assessment report generated by assessment service 124 rendered on display 160 according to FIG. 1. In this embodiment, a user manager or other administrator has performed a search for potential users and the performance analytics system has returned a list of potential users. The list of potential users is presented in a table that includes data elements relating to that particular potential user (e.g., user name, user title, date, user status) along with a user grade. The user grade in this embodiment presents as a textual element 603, but in other embodiments it can present as a graphical element (e.g., a graph detailing statistical properties of scores of fit of potential users for jobs), or in other ways as can be readily understood. Additionally, a search box 606 allows searching on many data elements and is not limited to those data elements enumerated above. The user interface diagram can include a 609 graph detailing statistical properties for the potential users. As shown, the assessment report can be sorted by user status, but it could be sorted by other data elements. Accordingly, a user manager can use the example user interface of FIG. 6A to create a list of potential users who may be an adequate fit for a job.

Figure 6B:
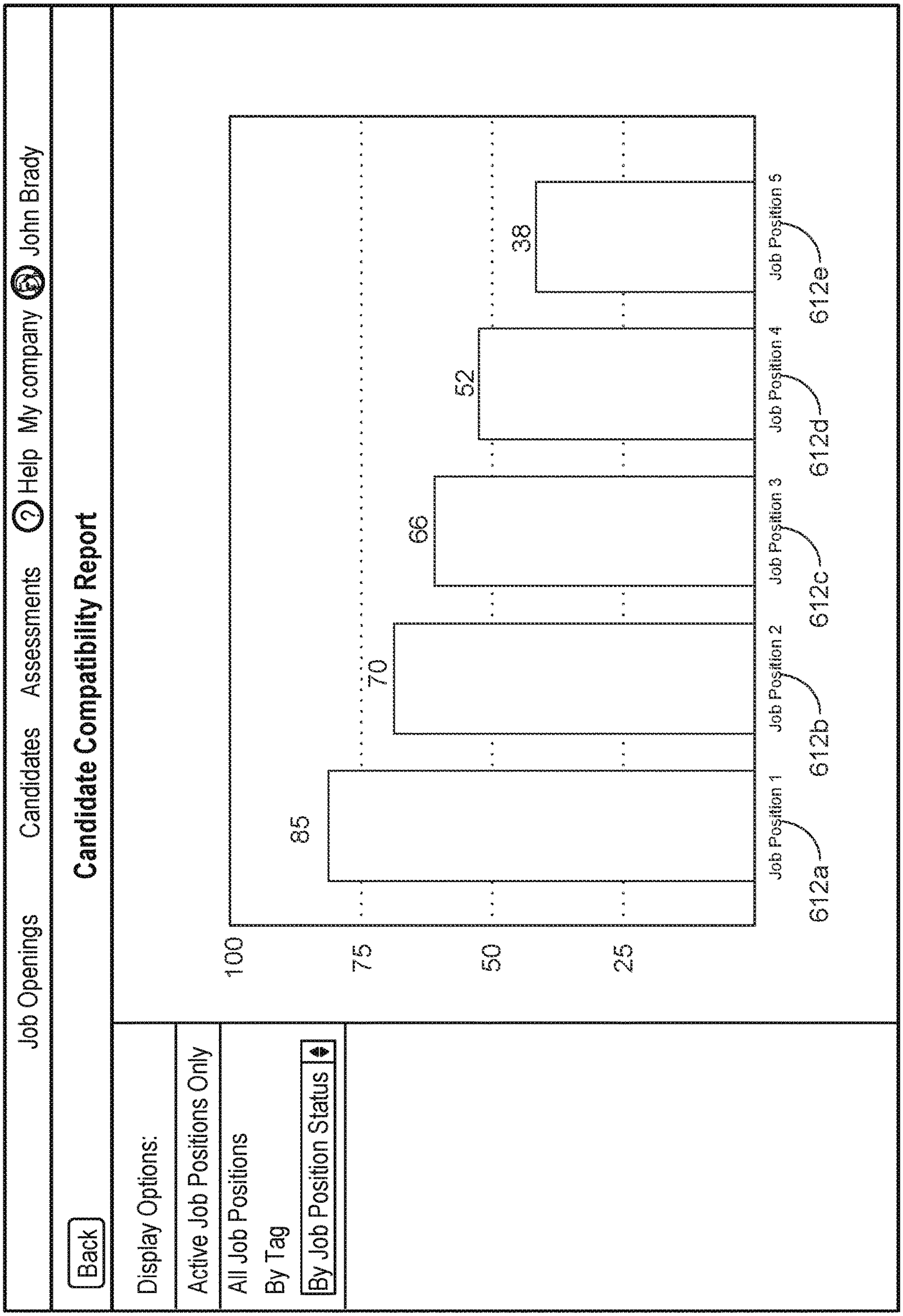

With reference to FIG. 6B, shown is a user interface diagram displaying an example of a user compatibility report generated by assessment service 124 rendered on display 160 according to FIG. 1. In this embodiment, a user manager or other administrator can view a list of potential job positions 612*a-e* for a single potential user or existing user. The outcomes 136 for multiple job positions 133 can be determined without the potential user applying for each of the job positions 133. As an example, a user manager can select to evaluate a potential user for multiple job positions 133. The assessment service 124 can generate a predicted outcome 136 for each of the job positions 133 for the potential user.

The list of potential job positions 133 can be presented in a graph that includes a user grade of the potential user, such as an outcome 136, for each of the job positions 612*a-e*. In one embodiment, the assessment service 124 can automatically score all users (e.g., associated with an entity) and potential users for all job positions 133 (e.g., proffered by the entity). As an example, the assessment service 124 can score all users and potential users for all job positions 133 without receiving a request from a user manager to evaluate a potential user. Accordingly, a user manager can use the example user interface of FIG. 6B to view a compatibility report for a potential user in view of multiple job positions 133.

Figure 7:
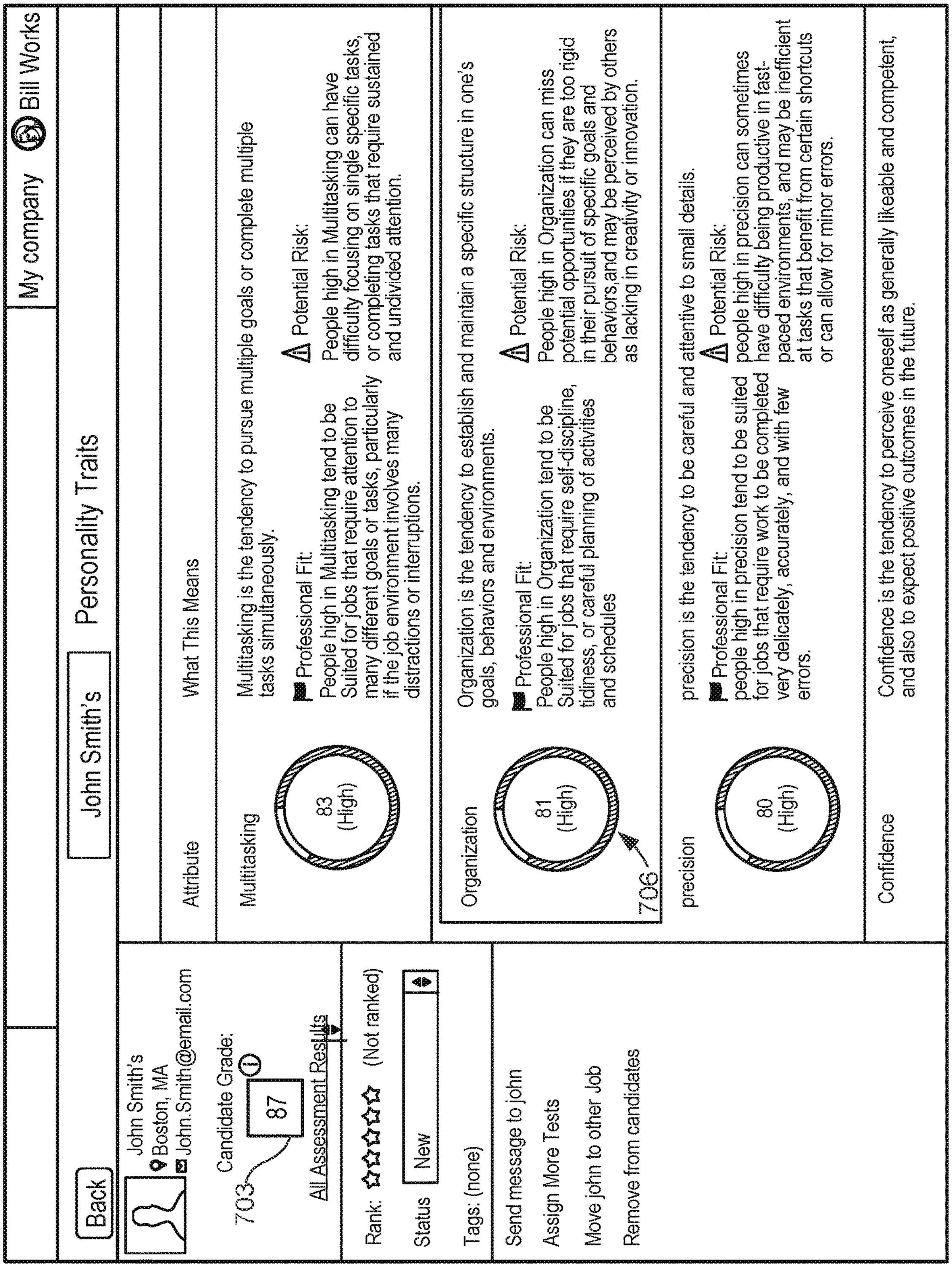
FIG. 7 is a pictorial diagram of another example user interface rendered by a client device in the performance analytics system of FIG. 1 according to various embodiments of the present disclosure.

Referring next to FIG. 7, shown is a user interface diagram displaying an example of a portion of an assessment report generated by assessment service 124 rendered on display 160. This example report displays, among other things, a way to view a particular potential user's overall grade 703 together with his or her individual grades broken down by scale 130. The user interface for an "Organization" attribute 706 can display a textual element and a graphical element representing the score of a potential user relating to organization skills. Here, the user interface has presented information (e.g., a description for scale score types) about the organization skills to describe the fit and potential risks characteristics of the organization skill. In this embodiment, a user manager or other administrator can send a message to the potential user, assign the potential user more tests, rank the potential user, assign tags to the potential user, or perform various other features as disclosed herein.

With reference next to FIG. 8, shown is a user interface diagram displaying an example of an analysis 127 generated by a query service 121 accessed by a analysis access application 157 and rendered on display 160. Here, a user has accessed an analysis 127 using a client device 106. Queries (e.g., 150 queries) have been prepared for the user to help assess the user's fit for either the user's current job position 133, a different job position 133, or both.

The example interface shown in FIG. 8 allows an user to provide input responsive to queries using a five-point responsive range 803 (e.g., Likert range), although the responsive range could also be a three-point range, a seven-point range, other range, or other input methods (e.g., text fields). A user can use the interface to navigate through an analysis 127 (e.g., using a back button to go to a previous page listing queries). Accordingly, the interface shown in FIG. 8 facilitates a user to starting an analysis 127, providing responses to queries, navigating an analysis 127, and recording and/or monitoring progress through the analysis 127. The responses to queries can be stored by analysis access application 157.

Figure 9:
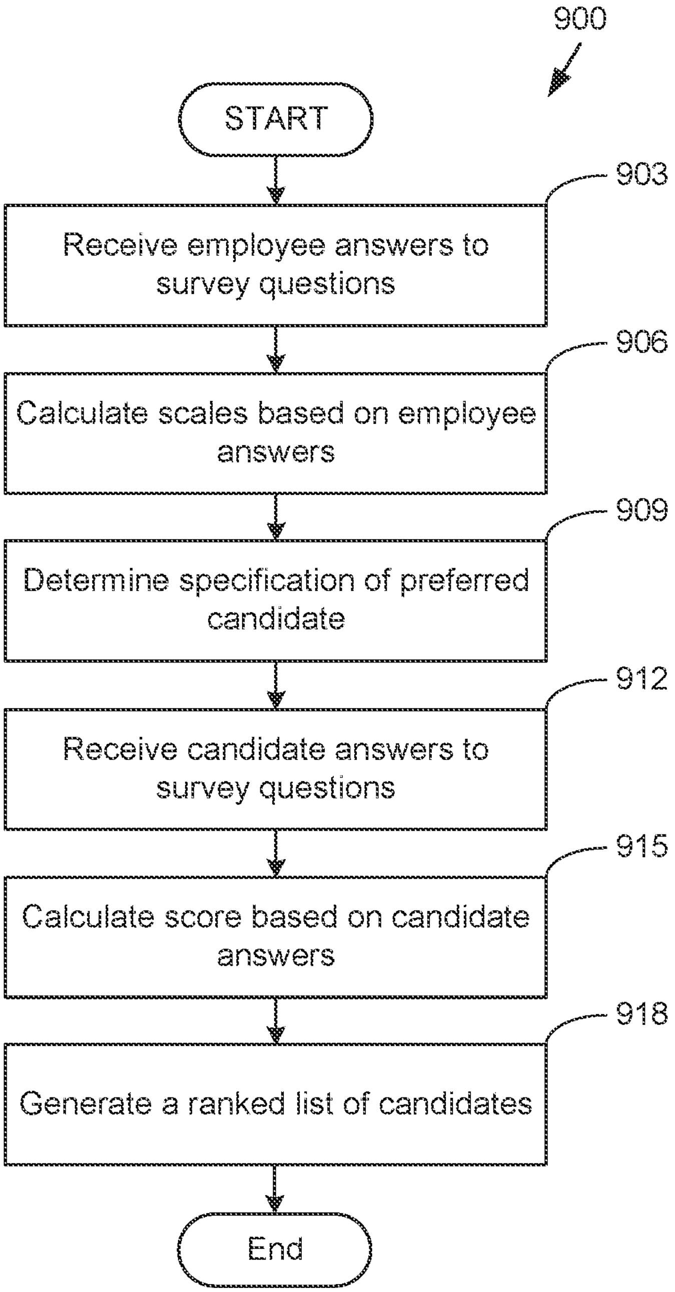
FIG. 9 is a flowchart illustrating one example of functionality implemented as portions of a modeling service, a query service, a data service, and an assessment service executed in a computing environment in the performance analytics system of FIG. 1 according to various embodiments of the present disclosure.

Referring next to FIG. 9, shown is a flowchart that provides one example of the operation of a portion of the performance analytics system 100 according to various embodiments. It is understood that the flowchart of FIG. 9 provides merely an example of the many different types of functional arrangements that may be employed to implement the operation of the portion of the performance analytics system 100 as described herein. As an alternative, the flowchart of FIG. 9 may be viewed as displaying an example of elements of a process implemented in the computing environment 103 (FIG. 1) according to one or more embodiments.

Beginning with box 903, the computing environment 103 receives user inputs responsive to queries. As described above, the user may provide the inputs using an analysis access application 157. The inputs may be gathered using a five-point responsive range (e.g., Likert range), three-point range, seven-point range, or another input method. In one example, the computing environment receives inputs from a user to a plurality of queries selected to determine the user's fit for a job position 133 within their current associated entity and/or to serve as a basis for a predictive model for predicting candidate fitness for admission to the job position 133.

At box 906, a modeling service 115 or query service 121 calculates scales 130 based on the inputs. The scale 130 can be based on a number of queries responded to affirmatively that correspond to the scale 130.

At box 909, the modeling service 115 creates a predictive model that includes the specification 148 of a preferred user (for example, a preferred user). The modeling service 115 can generate a predictive model including metadata 145. The predictive model can be based, among other things, on user data 139 and scales 130. The metadata 145 of the preferred potential user, or the specification 148, can include a model definition in any suitable format (e.g., a JSON format, other open-source XML format, or other proprietary format).

At box 912, the query service 121 receives a potential user's responses to queries. The potential user can provide inputs responsive to the queries using an analysis access application 157. Potential user responses can be gathered using a five-point responsive range (e.g., Likert range), three-point range, seven-point range, or other input method. In some embodiments, a potential user can save an analysis 127 and later resume the analysis 127 using the query service 121.

At box 915, the assessment service 124 computes an outcome 136 based on potential user inputs to the queries. For example, the assessment service 124 can calculate a score between 0-100, 0-5, or another scale describing the fit of the potential user for a job position 133. The calculation of the score can be performed in a number of different ways. The score can be based on a comparison of potential user responses to a specification 148 associated with the job position 133.

In one example, a number of users within a given organization provide inputs responsive to a plurality of queries. The inputs are used to generate the specification 148. Thus, an outcome 136 (e.g., a score) can be based on a comparison of scales 130 for a potential user to scales 130 of one or more users. Additionally, in another embodiment, an outcome 136 can be based on objective criteria such as a comparison of potential user responses to correct responses. This embodiment can be useful for determining a potential user's proficiency in a particular knowledge area.

At step 918, the assessment service 124 generates a ranked list of potential users. The results from one or more potential users taking an analysis 127 can be stored as potential user data 142 in the data store 112. An entity admin (for example, a user manager) can navigate a user interface (see, e.g., FIG. 6) to display a ranked list of potential users on a client device 106. One objective of displaying a ranked list of potential users is to identify a potential user who is a best fit for a job position 133. Thus, the ranked list can display, from among all the potential users with potential user data 142 in the data store 112, only those potential users who meet certain criteria. In this way, the number of potential users can be reduced by only evaluating the users who are the best fit with a job position 133. The potential users can also be filtered based on which potential users are currently seeking selection or admission and other factors configured to the needs and requirements of the entity.

Figure 10:
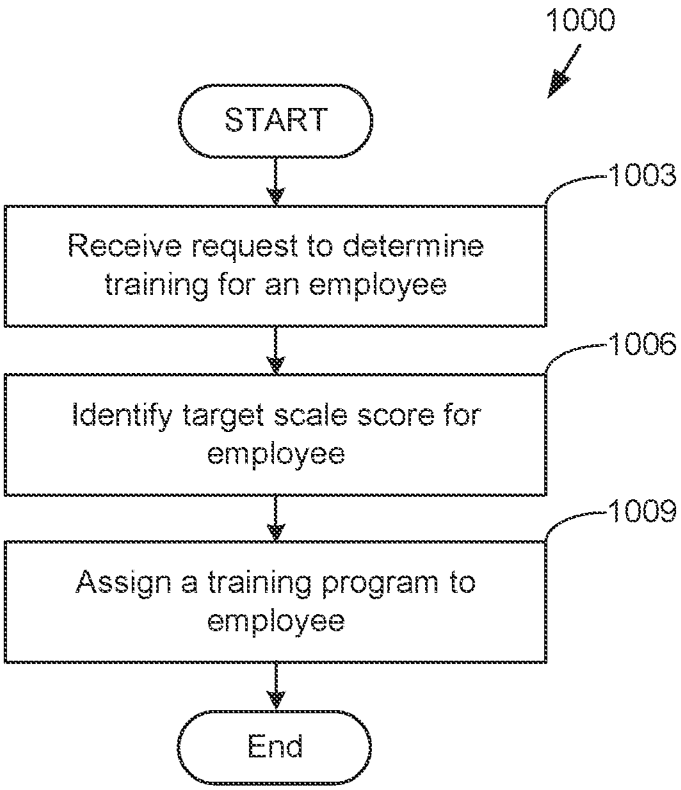
FIG. 10 is a flowchart illustrating one example of functionality implemented as portions of a modeling service, a query service, a data service, and an assessment service executed in a computing environment in the performance analytics system of FIG. 1 according to various embodiments of the present disclosure.

Referring next to FIG. 10, shown is a flowchart that provides another example of the operation of a portion of the performance analytics system 100 according to various embodiments. It is understood that the flowchart of FIG. 10 provides merely an example of the many different types of functional arrangements that may be employed to implement the operation of the portion of the performance analytics system 100 as described herein. As an alternative, the flowchart of FIG. 10 may be viewed as displaying an example of elements of a process implemented in the computing environment 103 (FIG. 1) according to one or more embodiments.

In one embodiment of the system, the performance analytics system 100 is used to assign training for a user. At box 1003, the assessment service 124 can receive a request to determine training for a user. In one example, a trainer submits a request to find a threshold quantity of users required to execute or recommend a specific training program that corresponds to improving one or more scale 130. In another embodiment, a user can submit a request to determine what training materials to recommend or provide users. In yet another embodiment, a user can provide inputs requesting a ranked list of training programs that would provide the biggest improvement to an outcome 136 of the user for a current or potential job position 133 of the user.

At box 1006, the assessment service 124 identifies a target scale score for training for a user. According to some examples, the assessment service 124 iterates through each scale 130 for the user and calculates a theoretical outcome 136 for the user if the scale 130 from the current iteration were greater by a predefined amount. Then, the assessment service 124 identifies the scale 130 that improved the outcome 136 by a greatest amount as the target scale score. The iterations can be limited to scales 130 corresponding to training courses currently recommended or provided. Further, the predefined amount from the calculation of the theoretical outcome 136 can be different for each scale 130, such as, for example, based on a projected improvement to the scale 130 from a training course. In another example, the assessment service 124 identifies the target scale score as the scale 130 that corresponds to a greatest coefficient 151.

An analysis 127 can be given to participants in training programs before and after to evaluate the improvement of the participant on given scales. When determining a target scale score for training, the predefined amount added to a scale 130 of the user can be based on the improvement of past participants. As an example, the user may be projected to improve "Confidence" by 12 points by taking a training program titled "Lead with Confidence," but only improve "Multitasking" by 2 points by taking "Secrets to Multitasking," where the projections are based on the past improvements of participants taking the training programs. However, in one example, the target scale score can still be "Multitasking" scale 130 if adding 2 points improves the outcome 136 by a greater amount than adding 12 to the "Confidence" scale 130.

At box 1009, the assessment service 124 assigns a training program to a user. The assessment service 124 can assign a training program corresponding to the target scale score to the user. In one embodiment, the assessment service 124 can assign training to a threshold quantity of users for a training program. In another embodiment, the assessment service 124 can schedule training programs for an entity based on which target scale scores are identified for users within the entity.

Turning to FIG. 11, shown is a performance analytics model 1100 according to various embodiments of the present disclosure. The performance analytics model 1100 includes subcomponents 1103*a*, 1103*b*, and 1103*c*. Each of the subcomponents can include a coefficients section 1106 and a statistical data section 1109. The coefficients section 1106 can include one or more coefficients 151, each of which can include a name value pair. The coefficients 151 contained in a given coefficients section 1106 can be based on whether a correlation, partial correlation or other statistical relationship exists between a scale 130 and performance data in user data 139. As a non-limiting example, if a scale 130 that corresponds to years of experience strongly correlates as a dependent variable on predicting an independent variable of skill for a job position 133, then a "abc_personal_exp" coefficient 151 can be included with a value of 8 in a coefficients section 1106 that is used to predict skill for the job position 133, as shown in subcomponent 1103*c*.

Figure 12:
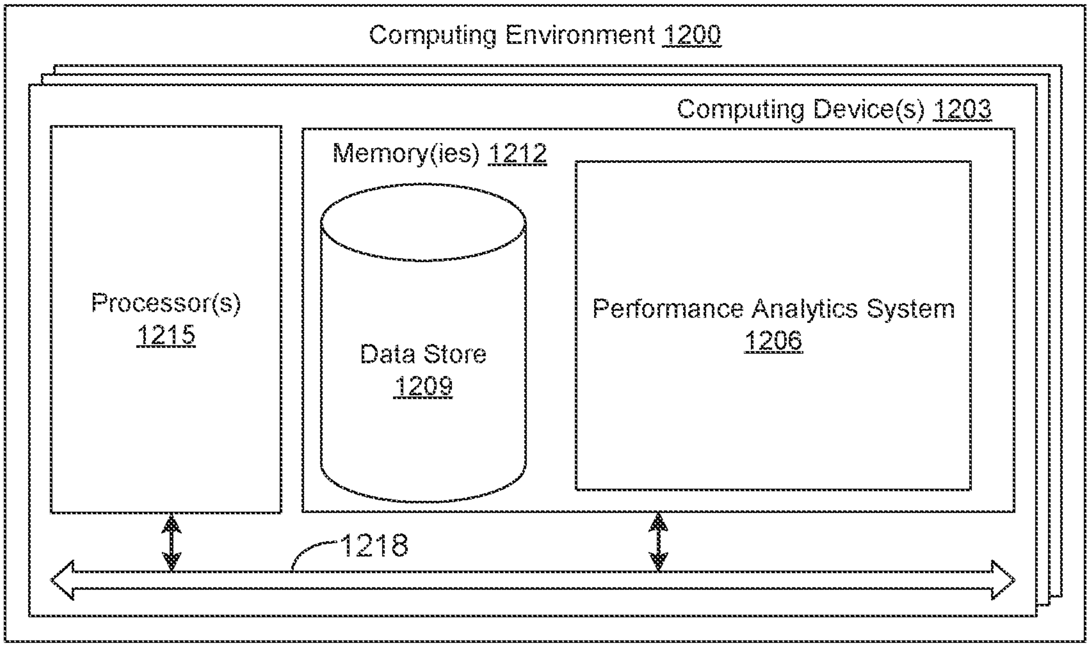
FIG. 12 is a schematic block diagram that provides one example illustration of a computing environment employed in the performance analytics system of FIG. 1 according to various embodiments of the present disclosure.

Moving on to FIG. 12, shown is a schematic block diagram of the computing environment 103 according to an embodiment of the present disclosure. The computing environment 103 includes one or more computing devices 1203. Each computing device 1203 includes at least one processor circuit, for example, having a processor 1215 and a memory 1212, both of which are coupled to a local interface 1218. To this end, each computing device 1203 may comprise, for example, at least one server computer or like device. The local interface 1218 may comprise, for example, a data bus with an accompanying address/control bus or other bus structure as can be appreciated.

Stored in the memory 1212 are both data and several components that are executable by the processor 1215. In particular, stored in the memory 1212 and executable by the processor 1215 are list of main applications, and potentially other applications. Also stored in the memory 1212 may be a data store 112 and other data. In addition, an operating system may be stored in the memory 1212 and executable by the processor 1215.

It is understood that there may be other applications that are stored in the memory 1212 and are executable by the processor 1215 as can be appreciated. Where any component discussed herein is implemented in the form of software, any one of a number of programming languages may be employed such as, for example, AJAX, C, C++, C #, Objective C, Java®, JavaScript®, Perl, PHP, Visual Basic®, Python®, Ruby, Flash®, or other programming languages.

A number of software components are stored in the memory 1212 and are executable by the processor 1215. In this respect, the term "executable" means a program file that is in a form that can ultimately be run by the processor 1215. Examples of executable programs may be, for example, a compiled program that can be translated into machine code in a format that can be loaded into a random access portion of the memory 1212 and run by the processor 1215, source code that may be expressed in proper format such as object code that is capable of being loaded into a random access portion of the memory 1212 and executed by the processor 1215, or source code that may be interpreted by another executable program to generate instructions in a random access portion of the memory 1212 to be executed by the processor 1215, etc. An executable program may be stored in any portion or component of the memory 1212 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1212 is defined herein as including both volatile and nonvolatile memory and data storage components. Volatile components are those that do not retain data values upon loss of power. Nonvolatile components are those that retain data upon a loss of power. Thus, the memory 1212 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1215 may represent multiple processors 1215 and/or multiple processor cores and the memory 1212 may represent multiple memories 1212 that operate in parallel processing circuits, respectively. In such a case, the local interface 1218 may be an appropriate network that facilitates communication between any two of the multiple processors 1215, between any processor 1215 and any of the memories 1212, or between any two of the memories 1212, etc. The local interface 1218 may comprise additional systems designed to coordinate this communication, including, for example, performing load balancing. The processor 1215 may be of electrical or of some other available construction.

Figure 13:
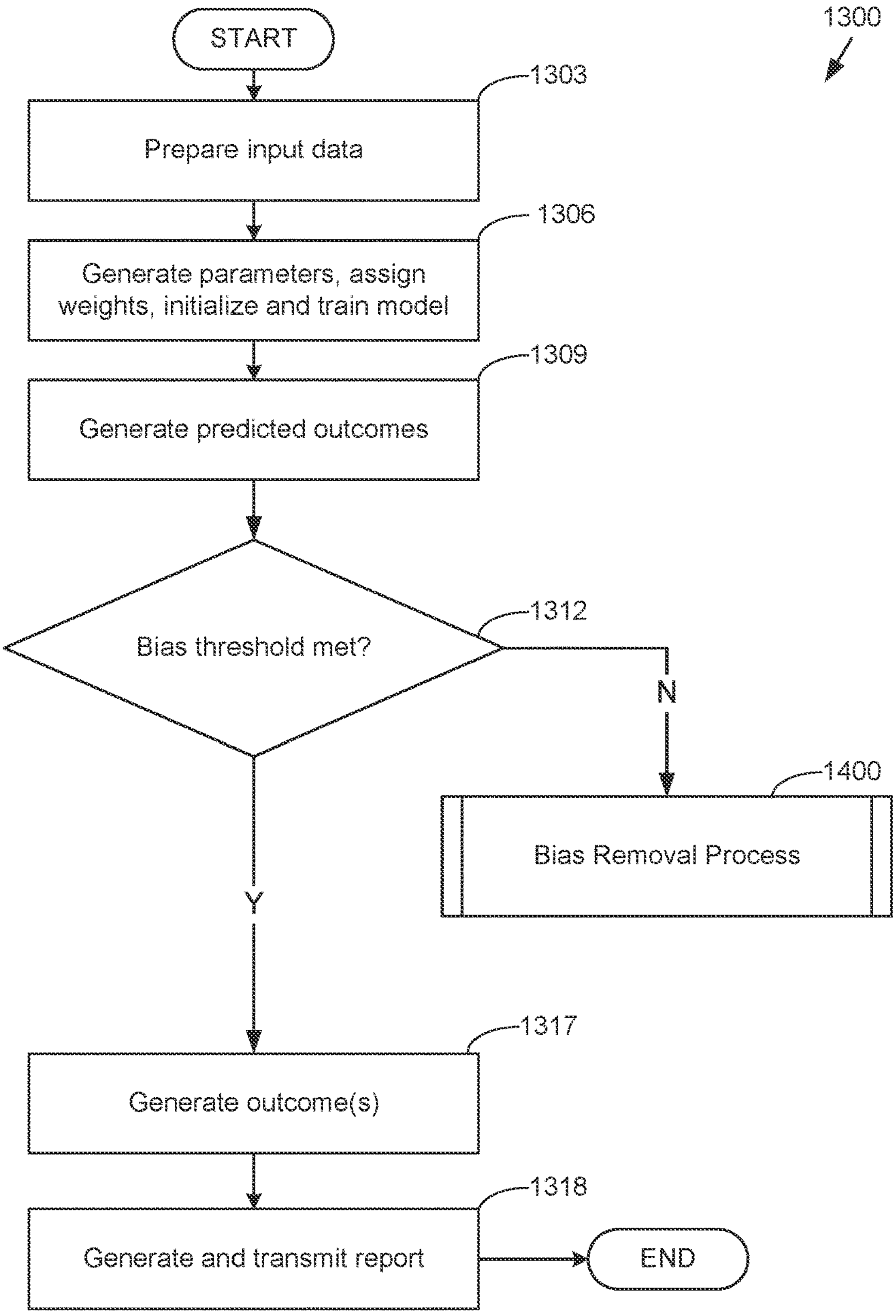
FIG. 13 is a flowchart illustrating one example of model generation and training functionality implemented as portions of a modeling service, a query service, a data service, and an assessment service executed in a computing environment in the performance analytics system of FIG. 1 according to various embodiments of the present disclosure.

Referring next to FIG. 13, shown is a flowchart that provides one example of the operation of a portion of the performance analytics system 100 according to various embodiments. It is understood that the flowchart of FIG. 13 provides merely an example of the many different types of functional arrangements that may be employed to implement the operation of the portion of the performance analytics system 100 as described herein. As an alternative, the flowchart of FIG. 13 may be viewed as displaying an example of elements of a process implemented in the computing environment 103 (FIG. 1) according to one or more embodiments.

With reference to FIG. 13, shown is a model generation and training process 1300. In various embodiments, the process 1300 can be performed by the modeling service 115, the assessment service 124, and/or the data service 118, among other system 100 components. At step 1303, the process 1300 includes preparing input data (for example, via the data service 118 and/or one or more additional components of the system 100). The input data can include, but is not limited to, user data 139 and/or potential user data 142. The input data can be limited to input data for users associated with a particular entity. In one example, the input data is user data 139 from a plurality of users of identical job function at a particular entity. In at least one embodiment, the input data includes a plurality of queries and a plurality of inputs responsive to each query. In one or more embodiments, the input data includes scales 130 for converting the plurality of inputs to scaled values that can be used as variables in the predictive model. In some embodiments, the plurality of inputs are automatically converted to variables using a plurality of corresponding scales 130. In one example, the input data includes a plurality of work and/or job performance queries and a plurality of inputs responsive thereto. In the same example, the input data can include scales 130 and/or scale values for translating each of the plurality of inputs into a measurable, relatable, and analyzable variable (e.g., such as a scale score as described herein).

In various embodiments, the input data can exclude data and information that is improper, unethical, and/or illegal to consider in particular human resource-related decisions (e.g., selecting, admitting, terminating, promoting, transferring, etc.). According to one embodiment, the input data can exclude one or more data categories, the one or more data categories including, but not limited to: 1) race (or skin color); 2) age; 3) ethnicity; 4) sex; 5) gender; 6) political affiliation; 7) religion; 8) pregnancy status; 9) disability status; 10) veteran status; 11) criminal history; 12) sexual orientation; 13) national origin; 14) genetic information; 15) family status; 16) physical traits (e.g., height, weight, etc.); 17) marital status; and 18) pecuniary information. The excluded input data can be referred to as “protected” data.

Preparing the input data can include, but is not limited to: 1) removing and/or imputing improper data values, such as null values and outlier values; 2) performing entity resolution to disambiguate and standardize linked, grouped, and/or synonymous terms, such as, for example, standardizing the terms “B. A.” and “Bachelor of Arts”; and 3) scaling the input data into variables using one or more scales 130. According to one embodiment, step 1303 can include indexing the input data to identify, flag, and/or remove protected data (as described herein).

At step 1306, the process 1300 includes generating a predictive model (for example, via the model service 115 and/or one or more additional components of the system 100). Generating the predictive model can include initializing a plurality of variables based on the input data and assigning weights to each variable. The process 1300 can utilize machine learning to process known inputs and outputs to generate the weights. The variables can correspond to nodes or compartments in an artificial intelligence neural network model. The weight assigned to each variable can be a value that determines the level of contribution the variable provides to an outcome 136 produced by the model, such as a suitability value. The plurality of variables can include composite variables. The composite variables can be combinations of two or more variables of the plurality of variables. Each composite variable can include a primary weight assigned to the overall composite variable and two or more secondary weights assigned to the two or more variables included in the composite variable.

Also at step 1306 the process 1300 includes initializing and training the predictive model (for example, via the model service 115 and assessment service 124) by applying machine learning and/or regression techniques to one or more training datasets. The machine learning techniques can include one or more of, but are not limited to, random forest classification, dimensionality reduction, clustering, classification, neural nets and deep learning, and artificial neural networks, among others. According to one embodiment, training of predictive models can be performed using processes of recursive regressions (e.g., to identify, isolate, and exclude variables that contribute to bias or differential validity in a predictive model). In various embodiments, the machine learning techniques and/or recursive regressions are utilized to perform anti-biasing and anti-differential processes described herein (such as, for example, the process 1400 and process 1500).

Two training datasets can be prepared. The first training dataset can include a subset of the input data and a plurality of variables based on the subset of the input data. The first training dataset can include a set of known outcomes 136 associated with the subset of the input data. The second training dataset (e.g., referred to as the “validation” set) can include a second subset of the input data and a plurality of variables based on the second subset of the input data. The validation dataset can include a second set of known outcomes 136 associated with the second subset of the input data. According to one embodiment, the first and second subsets of the input data are mutually exclusive, which can reduce a probability overfitting the predictive model to the first training dataset. The first training dataset and the validation dataset can each excluded protected data, as described herein. In some embodiments, the excluded protected data can be stored separate from the training datasets. As such, although the protected data can be excluded from the training of the machine learning based model, the protected data can be available for analysis of the neural network or other predictive model compartmentalized variables.

In one example, the input data includes data describing workplace performance and other applicable factors of 100 users at a particular entity. In the same example, based on the input data, the first training dataset can include data (and variables generated therefrom) describing 80 out of 100 users, and the validation dataset can include data and variables describing the remaining 20 out of 100 users. Continuing the same example, the data describing each user can include one or more known outcomes 136 for use in computing the validity and training the predictive model.

Following generation of the variables of the first training dataset, each variable is assigned an initial weight value. The initial weight value can be a value that defines a level of contribution the variable is assigned over an output of the model. In one example, a variable “Punctuality” can be given a weight value 0.05 and a second variable “Length of Work History” can be given a weight value 0.09. In at least one embodiment, the initial weight values can be based on one or more analyses (e.g., such as regression analyses) of the known outcomes and variables of the first training dataset. The initial (and subsequent) weight values can be automatically and/or manually modified on an iterative basis to improve the validity (e.g., accuracy and precision) of the predictive model.

The predictive model (e.g., a first iteration thereof) can be initialized with the input data and variables of the first training dataset. The predictive model can generate a first set of predicted outcomes 136. The first set of predicted outcomes 136 can be compared to the known outcomes 136 associated with the first training dataset. One or more error metrics can be computed between the predicted and known outcomes 136. Based on the one or more error metrics, the weight values assigned to the variables of the first training dataset can each be modified (e.g., increased or decreased) with an objective of reducing the one or more error metrics in a second set of predicted outcomes 136. The one or more error metrics can include validity metrics.

In one example, the first set of predicted outcomes 136 demonstrates a validity metric of 50%. In the same example, the weight values assigned to the variables associated with the first set of predicted outcomes are each increased, decreased, or are unchanged such that a second set of predicted outcomes 136 demonstrates a validity metric of 65%.

It will be understood by one of ordinary skill in the art that not all weight values of all variables are modified when training the predictive model. In at least one embodiment, the process of comparing predicted outcomes 136 to known outcomes 136 and modifying assigned weight values towards reducing error metrics is performed iteratively until the error metrics comply with predetermined error metric thresholds. For example, the predictive model can be trained with the first training dataset until an iteration of the predictive model generates predicted outcomes 136 that demonstrate a validity metric of at least 80%.

The predictive model can be validated using the validation dataset. The predictive model can be initialized using the validation dataset and the variables thereof can be assigned the weight values of the best-performing iteration of the predictive model (e.g., the variables being reciprocal between the first training and validation datasets). The predictive model can generate a second set of predicted outcomes 136 based on the validation dataset. A second set of error metrics can be computed by comparing the second set of predicted outcomes 136 compared to a set of known outcomes associated with the input data of the validation training dataset. The predictive model can be trained (e.g., variable weights can be modified) until the predictive model generates a set of predicted outcomes 136 demonstrating error metrics that comply with the one or more error thresholds.

In at least one embodiment, the steps 1303 and 1306 include one or more steps of the process 900 described herein. According to one embodiment, the steps 1303 and 1306 can be substituted by one or more steps of the process 900.

At step 1309, the process 1300 includes generating predicted outcomes 136 using the trained, validated, and error threshold-satisfying iteration of the predictive model. The predictive model can be initialized with input data and variables produced therefrom, the input data lacking a set of known outcomes 136. The variables can be assigned the same weights of the previous variables used in the final iteration of the predictive model (e.g., the current and previous variables being identical in construct, except for value). The predictive model can generate a set of predicted outcomes 136 based on the input data and the weighted variables.

At step 1312 the process includes determining that the predictive model satisfies a plurality of bias thresholds. According to one embodiment, a bias threshold generally refers to a measure of correlation between the predicted outcomes 136 of the predicted model and protected data. The correlation metric can include, but is not limited to, Pearson, Kendall, Spearman, and/or other correlation metrics. According to one embodiment, the correlation metric is an R2 value, or the like. In one example, a bias threshold for race is a Pearson correlation between a set of predicted outcomes 136 (each outcome 136 being associated with a particular user) and racial demographic data (e.g., describing each of the particular users). In the same example, the bias threshold is satisfied when the computed Pearson correlation is below about 0.5.

The magnitudes of the one or more bias thresholds can be configured automatically and/or manually (e.g., via input from an electronic input device). The one or more bias thresholds can include a bias threshold for each class of protected data in the data store 112. For example, the one or more bias thresholds include, but are not limited to: 1) race (or skin color); 2) age; 3) ethnicity; 4) sex; 5) gender; 6) political affiliation; 7) religion; 8) pregnancy status; 9) disability status; 10) veteran status; 11) criminal history; 12) sexual orientation; 13) national origin; 14) genetic information; 15) family status; 16) physical traits (e.g., height, weight, etc.); 17) marital status; and 18) pecuniary information. According to one embodiment, the one or more bias thresholds include a threshold for each type or classification data included in the protected data described herein.

In one or more embodiments, if any of the one or more bias thresholds is exceeded, the process 1300 proceeds to bias removal process 1400. In various embodiments, if all of the bias thresholds are satisfied, the process 1300 proceeds to step 1317.

At step 1317, the process 1300 includes generating a final predictive model. The final predictive model can be provided or used to analyze data. As an example, the final predictive model can be used in steps 915 and 918 to compute the values for potential users and generate a ranked list of potential users. The step 1317 can include, but is not limited to: 1) the assessment service 124 generating a ranked list of potential users based on predicted outcomes 136 generated by the predictive model using the input data (e.g., the input data excluding protected data and a set of known outcomes 136); and 2) storing the predicted outcomes 136 as potential user data 142 in the data store 112. According to one embodiment, a model identifier can be generated and associated with the predictive model, and the model identifier can be stored with the potential user data 142.

At step 1318, the process 1300 includes generating and transmitting a report based on the predicted outcomes 136 of the predictive model. The report can be an assessment report generated by the assessment service 124. The report can include a description of the object of the predicted outcomes 136. For example, if the object of the predicted outcomes 136 is to predict a likelihood of success in an analyst position at Entity A, the report can include a description "The Top Predicted Candidates for Analyst at Entity A." The report can include a list of potential users (e.g., such as candidates) ranked according to their corresponding predicted outcomes 136. According to one embodiment, the report includes only the potential user associated with the highest or most optimal predicted outcome 136. In one or more embodiments, the report includes additional interfaces, such as, for example, one or more user interfaces shown in FIGS. 2A-8 and described herein.

Figure 14:
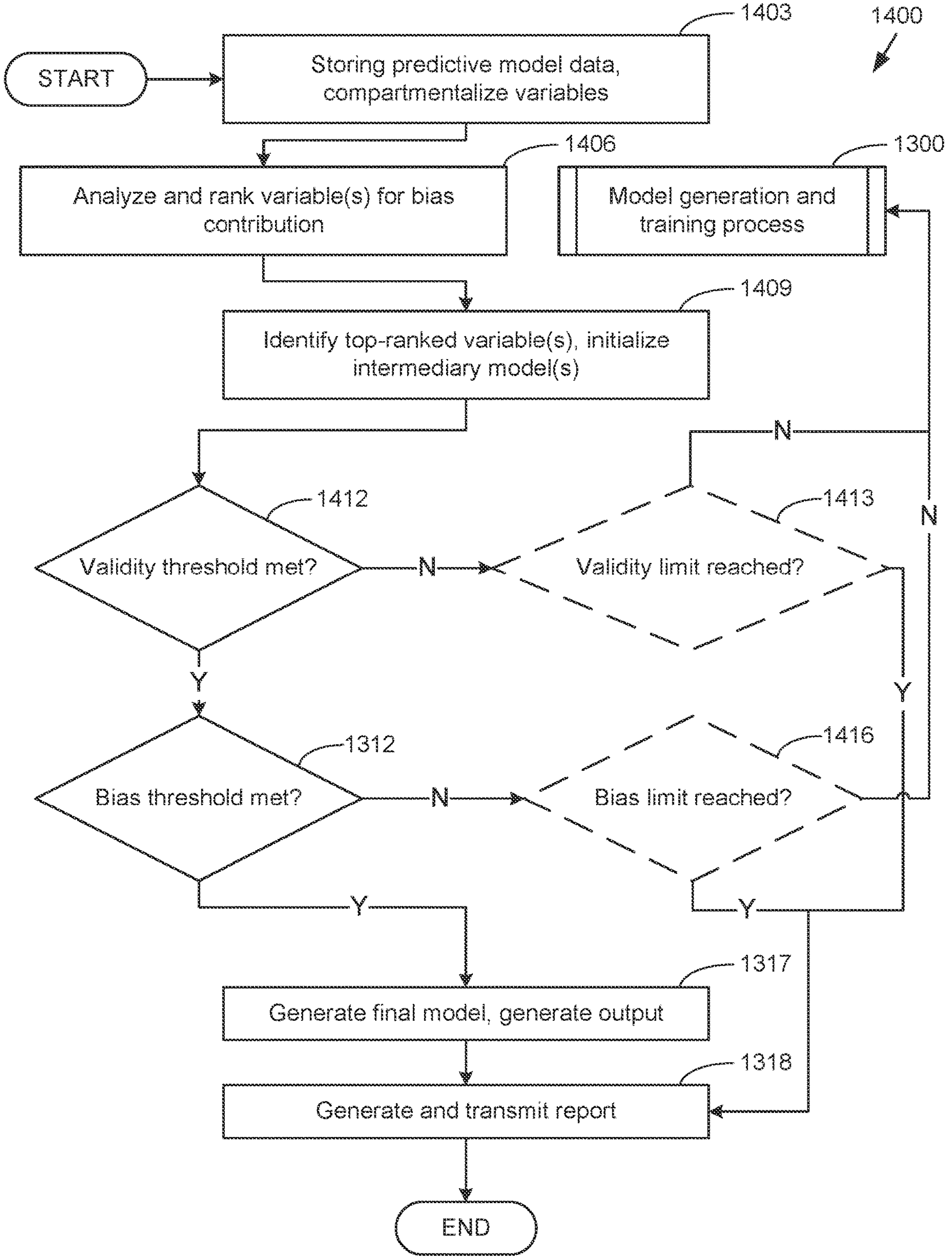
FIG. 14 is a flowchart illustrating one example of bias removal functionality implemented as portions of a modeling service, a query service, a data service, and an assessment service executed in a computing environment in the performance analytics system of FIG. 1 according to various embodiments of the present disclosure.

With reference to FIG. 14, shown is an exemplary bias removal process 1400. In various embodiments, the process 1400 can be performed by the modeling service 115, the assessment service 124, and/or the data service 118, among other system 100 components.

At step 1401, the process 1400 includes storing initial predictive model data. The predictive model data can include a predictive model (including metadata 145, user data 139, and potential user data 142 thereof). The predictive model data can also include all variables and corresponding weight values (such as coefficients 151) used in the predictive model. The predictive model data can include a set historical error, validity metrics, and/or bias thresholds determined to be satisfied by the predictive model (e.g., during the process 1300). The predictive model data can include one or more bias thresholds determined to be unsatisfied by the predictive model.

At step 1403, the process 1400 can include compartmentalizing the variables into a plurality of analytical compartments (e.g., one variable or composite variable to each analytical compartment). The plurality of analytical compartments can be analyzed individually and in aggregate for their contribution to bias detected in the output of the predicted model.

Analytical compartments that include composite variable (as described herein) can include each of the individual variables (and any associated weight values) that form the composite variable. For example, if a composite variable "Trucking Work Performance" includes a set of variables "Focus," "Punctuality," "Introversion," and "Organization," the compartment of the composite variable includes the set of variables and any weight values corresponding thereto. Because the predictive model variables, combinations of variables (e.g., composite variables, interaction products, etc.), and variable transformations can be isolated into a plurality of compartments, the effect(s) of each variable, combination of variables, and variable transformation on bias in the predictive model output can be analyzed.

In one or more embodiments, if the predictive model utilizes nodes and combinations of nodes (e.g., composite nodes), the nodes and composite nodes can each be isolated into an analytical compartment. In at least one embodiment, if the predictive model utilizes layers, sub-layers, combinations of layers and/or sub-layers (e.g., composite layers), the layers, sub-layers, and composite layers can each be isolated into an analytical compartment.

At step 1406, the process 1400 includes analyzing the contribution of each variable to the bias detected in the output of the predictive model (e.g., outcomes 136). The bias can be a classification based on the bias threshold determined to be unsatisfied by the predictive model, and the bias can be associated with a set of demographic data corresponding to the potential users and/or users associated with the output of the predictive model. In one example, the bias is sex: "female" (e.g., the outcomes 136 of the predictive model failed to meet a sex: "female" bias threshold).

To determine bias contribution, the predicted outcomes 136 and the variable of each compartment can be correlated with demographic data associated with the detected bias. A contribution value can be computed for each compartment, and the contribution value can be a metric describing a magnitude of correlation between the compartment and the bias detected in the predictive model output.

In composite compartments, each variable therein can be correlated with the predicted outcomes 136 and the demographic data, and a contribution value can be computed for each variable in the composite variable. A variable may demonstrate a low contribution to the bias in isolation (e.g., when not included in a composite variable); however, the same variable may demonstrate an increased contribution to the bias when included in a composite variable. Because bias contribution can be dependent on variable combination, evaluation of each variable in a composite variable can be performed to accurately and precisely identify a probable source of bias (e.g., while avoiding misidentifying other variables of the composite variable as being bias contributing).

In at least one embodiment, the bias contribution of each compartment can be evaluated by generating a plurality of intermediary predictive models, each intermediary predictive model excluding one or more variables of an analytical compartment. Each intermediary predictive model can be initialized with the input data, variables, and weight values of the iteration of the predictive model in which bias was detected during the process 1300. Predicted outcomes 136 of each intermediary predictive model can be analyzed to determine whether the predicted outcomes 136 thereof demonstrate a reduced bias level compared to the bias level detected in the original bias threshold-violating iteration of the predictive model. The change in measured bias for each intermediary predictive model can be computed (e.g., in the same manner the predictive models are analyzed for bias threshold satisfaction). The change in measured bias can be the contribution value assigned to each variable of each compartment, and, thus, the compartments and/or variables thereof can be ranked from greatest decrease (or smallest increase) to smallest decrease (or greatest increase).

In some embodiments, the system can iterate through nodes or compartment on a decision tree to identify the contribution of each node or compartment to the bias detected in the output of the predictive model.

Also at step 1406, the compartments and assigned contribution values can be stored in memory, such as, for example, as metadata of the outcomes 136 or the predictive model. The assessment service 124 can generate a list of the compartments (and/or variables and composite variables thereof) and the compartments can be ranked according to their assigned contribution value. The ranked list of the compartments (or variables and composite variables) can be stored as metadata of the outcomes 136 or the predictive model.

At step 1409, the process 1400 includes identifying one or more top-ranked, bias-contributing variables. The model service 115 can receive the ranked list of compartments and can identify one or more top-ranked bias-contributing compartments (or variables). For each top-ranked compartment, the model service 115 can generate an intermediary predictive model that excludes the variable associated with the compartment. The model service 115 can initialize each intermediary predictive model using the validation dataset and variable weights of the initial, biased iteration of the predictive model. The model service 115 can perform the process 1300 to generate and train each intermediary predictive model. At step 1303 and/or 1306, the model service 115 can exclude the one or more top-ranked, bias contributing variables (and/or associated input data thereof) from inclusion in the intermediary predictive model.

For compartments that include composite variables, the model service 115 can exclude the variable of the composite variable that was assigned the highest contribution value, thus the composite variable is preserved, less the top bias-contributing variable. In one or more embodiments, the top-ranked variable of the composite variable can be replaced with a substitute variable.

Each intermediary predictive model can generate a set of outcomes 136. Each intermediary predictive model (including metadata 145 thereof) and outcomes 136 (including metadata thereof) can be stored in memory.

At step 1412, the process 1400 includes the assessment service 124 and/or modeling service 115 determining that each intermediary predictive model satisfies a validity threshold (e.g., the validity threshold that the initial predictive model was evaluated against). If an intermediary predictive model demonstrates outcomes 136 that do not comply with the validity threshold, the process 1400 can proceed to step 1413 and/or process 1300. According to one embodiment, step 1413 may be an optional step that can be configured by an operator or executor of the present system or process. In at least one embodiment, if step 1413 is not configured, the process 1400 can proceed to the process 1300. In various embodiments, when the process 1400 proceeds to process 1300, the intermediary model (e.g., metadata 145 thereof) can be used to initialize and train a new predictive model that excludes the one or more top-ranked, bias-contributing variables. Thus, in at least one embodiment, the predictive model generated based on each variable compartment can be a new, novel treatment of the dataset that we are comparing to the treatment of the primary dataset (e.g., in previous iterations of the predictive model). The new predictive model can be analyzed for validity and bias, and the processes 1300 and 1400 can be repeated as required to produce an iteration of the predictive model that does not violate validity or bias thresholds.

If an intermediary predictive model demonstrates outcomes 136 that comply with the validity threshold, the process 1400 can proceed to step 1312.

It will be understood to one of ordinary skill in the art that the process 1400 can be performed in a parallel manner. For example, at step 1412, a subset of the intermediary predictive models can be determined to violate the validity threshold and a second subset can be determined to comply with the validity threshold. In the same example, the process 1400 can proceed to step 1413 (and/or perform process 1300) for the first subset and simultaneously proceed to step 1312 for the second subset.

At step 1413, the process 1400 includes determining that a validity testing limit has been reached. The validity testing limit can be a predetermined recursion limit based on a validity test counter that is incremented each time a predictive model is determined to violate the validity threshold. Each intermediary predictive model can be assigned a validity test counter that is incremented when the process 1400 determines that an iteration of the intermediary predictive model has not satisfied the validity threshold. If the validity test counter of the predictive model is determined to comply with the validity testing limit, the process 1400 can proceed to the process 1300.

In at least one embodiment, if the validity test counters of one or more intermediary predictive models are determined to exceed the validity testing limit, the process 1400 can proceed to step 1318 (as described herein) and generate a report and/or alert describing the one or more intermediary predictive models, validity metrics thereof, and the corresponding validity testing limit. In one or more embodiments, if all (or a predetermined number) of the intermediary predictive models meet the validity testing limit, the assessment service 124 and/or the modeling service 115 can automatically relax (e.g., reduce) the predetermined validity threshold to which the intermediary predictive models are compared at step 1412. In at least one embodiment, if the validity test counter of an intermediary predictive model exceeds the validity testing limit, the model service 115 and/or assessment service 124 eliminates the intermediary predictive model from further analysis.

At step 1312, the process 1400 includes the assessment service 124 and/or modeling service 115 determining that each intermediary predictive model satisfies a bias threshold (e.g., the bias threshold that the initial predictive model was evaluated against). If an intermediary predictive model demonstrates outcomes 136 that do not comply with the bias threshold, the process 1400 can proceed to step 1416 and/or the process 1300. According to one embodiment, step 1416 may be an optional step that can be configured by an operator or executor of the present system or process (for example, a user manager). In at least one embodiment, if step 1416 is not configured, the process 1400 can proceed to the process 1300 (e.g., to generate and train a new predictive model that excludes the one or more top-ranked, bias-contributing variables).

If an intermediary predictive model demonstrates outcomes 136 that are determined to not violate the bias threshold, the process 1400 can proceed to step 1317.

It will be understood to one of ordinary skill in the art that the process 1400 can be performed in a parallel manner. For example, at step 1312, a subset of the intermediary predictive models can be determined to violate the bias threshold and a second subset can be determined to comply with the bias threshold. In the same example, the process 1400 can proceed to step 1416 (or step 1406) for the first subset and simultaneously proceed to step 1317 for the second subset. In at least one embodiment, the subset of the intermediary predictive models determined to comply with the bias threshold can be stored in memory and the process 1400 can wait to proceed to step 1317 until the model service 115 and/or assessment service 124 has eliminated the remaining, bias threshold-violating subset of the intermediary predictive models (e.g., or has modified the subset such that the recursively modified iterations of intermediary predictive models comply with the bias threshold).

At step 1416, the process 1400 includes determining that a bias testing limit has been reached. The bias testing limit can be a predetermined recursion limit based on a bias test counter that is incremented each time a predictive model is determined to violate the bias threshold. Each intermediary predictive model can be assigned a bias test counter that is incremented when the process 1400 determines that an iteration of the intermediary predictive model has not satisfied the bias threshold. If the bias test counter of the predictive model is determined to comply with the bias testing limit, the process 1400 can proceed to the process 1300.

In at least one embodiment, if the bias test counters of one or more intermediary predictive models are determined to exceed the bias testing limit, the process 1400 can proceed to step 1318 (as described herein) and generate a report and/or alert describing the one or more intermediary predictive models, bias metrics thereof, and the corresponding bias testing limit. In one or more embodiments, if all (or a predetermined number) of the intermediary predictive models meet the bias testing limit, the assessment service 124 and/or the modeling service 115 can automatically relax (e.g., reduce) the predetermined bias threshold to which the intermediary predictive models are compared at step 1412. In at least one embodiment, if the bias test counter of an intermediary predictive model exceeds the bias testing limit, the model service 115 and/or assessment service 124 eliminates the intermediary predictive model from further analysis.

At step 1317, the process includes generating a final predictive model based on the one or more intermediary predictive models determined to comply with the bias threshold. According to one embodiment, step 1317 includes ranking the one or more intermediary predictive models in order of decreasing bias metrics (e.g., a model with the lowest computed bias metrics is ranked first). In at least one embodiment, the one or more intermediary predictive models are ranked in order of decreasing validity metrics (e.g., a model with the highest computed validity metrics is ranked first). In one or more embodiments, the assessment service 124 can compute a validity-bias ratio for each of the one or more intermediary predictive models by dividing each model's validity metric by the corresponding bias metric. The one or more intermediary predictive models can be ranked in order of decreasing validity-bias ratio, thereby generating a list of predictive models ranked from most valid and least biased to least valid and most biased. The assessment service 124 can identify a final predictive model from the ranked list of intermediary predictive models.

Output of the final predictive model can be generated, and the outcomes 136 therefrom can be stored. In one embodiment, the outcomes 136 (each being associated with a user) can be used to generate a ranked list of users. In one example, the outcomes 136 are candidate scores for predicting the success of a plurality of candidates for a job position 133. In the same example, the plurality of candidates can be ranked from highest predicted success to lowest predicted success based on their corresponding candidate scores. In another example, the outcomes 136 are a set of candidate scores for predicting the success of a candidate in a plurality of job positions 133. In the same example, a ranked list of the plurality of job positions 133 can be generated based on ranking the job positions 133 according to their associated candidate score.

At step 1318, the process 1400 can include the assessment service 124 generating an assessment report including, but not limited to: 1) the outcomes 136 of the final predictive model; 2) the ranked list of users; and 3) the highest weighted variables of the final predictive model (e.g., the variables with the highest coefficients 151); 4) metadata 145; 5) input data (e.g., queries, analyses 127, etc.) with which the final predictive model was initialized; 7) one or more user interfaces for visualizing and/or facilitating interaction with the output of the final predictive model; and/or 8) classifications of protected data excluded from the model. In at least one embodiment the assessment report includes only the ranked list of users (e.g., the assessment report is abstracted from the raw outcomes 136).

In one or more embodiments, the assessment report can be automatically uploaded to a secure server accessible to an entity associated with the outcomes 136. In at least one embodiment, access to the secure server can be facilitated via an application programming interface (API) that receives and validates security information (e.g., IP addresses, encryption keys, etc.) from the entity before permitting access to the assessment report.

Figure 15:
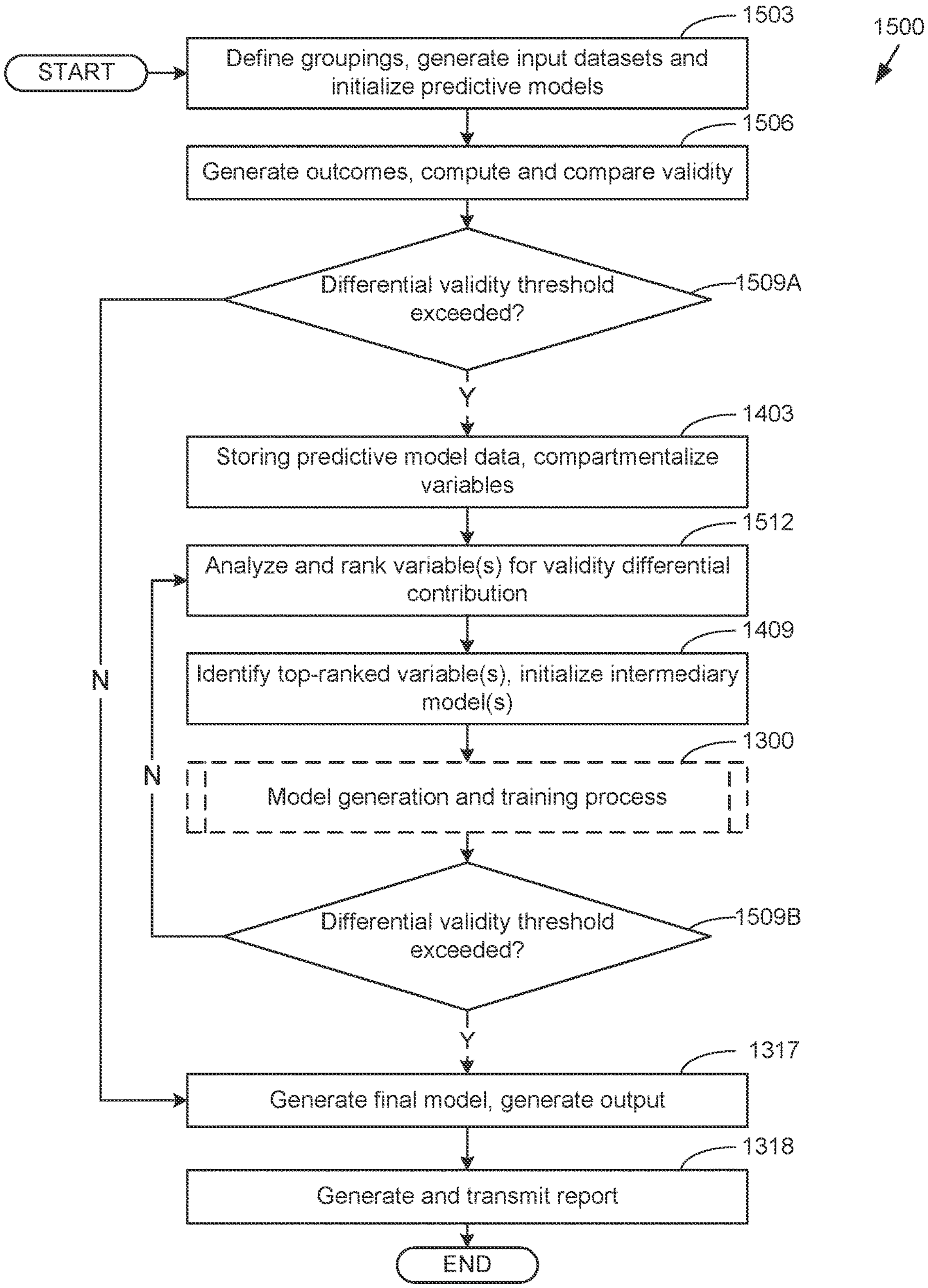
FIG. 15 is a flowchart illustrating one example of differential validity identification functionality implemented as portions of a modeling service, a query service, a data service, and an assessment service executed in a computing environment in the performance analytics system of FIG. 1 according to various embodiments of the present disclosure.

With reference to FIG. 15, shown is validity differential detection and reduction process 1500. In various embodiments, the process 1400 can be performed by the modeling service 115, the assessment service 124, and/or the data service 118, among other system 100 components.

At step 1503, the process 1500 includes defining two or more groupings of protected data based on a protected data category or class. The protected data is associated with input data (e.g., and corresponding subjects, such as users) utilized by an initial predictive model (e.g., a trained, validity and bias threshold-compliant performance model). In one example, the category is sex and the two or more groupings include a female grouping and a male grouping. In at least one embodiment, the input data is a training dataset, as described herein, and, thus, a set of known outcomes 136 can be accessed (e.g., for validity computation purposes).

At step 1503, the process 1500 includes generating two or more input datasets based on the two or more groupings. For each grouping, a corresponding subset of the input data of the training dataset can be isolated into an input dataset. In one example, for a female grouping, a subset of the input data associated with female subjects is isolated into a female input dataset. In the same example, for a male grouping, a subset of the input data associated with male subjects is isolated into a male input dataset.

At step 1503, the process 1500 includes initializing a predictive model for each of the two or more groupings. Each predictive model can include the input dataset associated with the predictive model's corresponding grouping. Each predictive model can also include the metadata 145 of the initial predictive model, thus each initialized predictive model can utilize the same specification 148, coefficients 151, etc., such that the outputs of the predictive models can be compared (e.g., both between the initialized predictive models and against the initial predictive model).

At step 1506, the process 1500 includes generating, via each initialized predictive model, a set of predicted outcomes 136. Based on comparing the set of predicted outcomes 136 to the known outcomes 136 of the training dataset, a validity metric can be computed for each initialized predictive model. The validity metric of each initialized predictive model can be stored in metadata 145.

At step 1509A, the process 1500 includes determining that the initialized predictive models do not exceed a differential validity threshold. The difference between the validity metric of each initialized predictive model and each other initialized predictive model can be computed and compared to a predetermined differential validity threshold. If the computed difference of a pair of validity metrics exceeds the differential validity threshold, the assessment service 124 and/or model service 115 can flag the associated, initialized predictive models for further analysis and the process 1500 can proceed to step 1403. If the computed difference of each pair of validity metrics is within the differential validity threshold, the process 1500 can proceed to step 1317. Following step 1317, the process 1500 can proceed to step 1318.

At step 1403, the process 1500 includes storing the data associated with each initialized predictive model (e.g., including associated input dataset, metadata 145, predicted outcomes 136, validity metrics and computed differences, etc.). As described herein, each variable of each initialized predictive model can be compartmentalized into an analysis compartment for further evaluation.

At step 1512, the process 1500 includes analyzing ranking the contribution of each variable to the identified validity differential. In at least one embodiment, actions performed at step 1512 can be generally similar to steps performed in step 1409 described herein, with a main difference being that the actions of step 1512 are directed towards quantifying the variables' contributions to the validity differential (e.g., in place of contributions to a detected bias). The variables of each initialized predictive model can be ranked based on their computed contribution to the validity differential.

At step 1409, the process 1500 includes identifying one or more top-ranked variables of each initialized predictive model and initializing an intermediary predictive model based on the initial predictive model, the intermediary predictive model excluding the one or top-ranked variables identified in each of the initialized predictive models. The intermediary predictive model can generate two or more sets of predictive outcomes 136. Each set of predictive outcomes 136 can be generated by executing the intermediary predictive model with one of the two or more groupings (e.g., and the corresponding input dataset thereof). In other words, the intermediary predictive model can be duplicated into two or more additional intermediary predictive models (e.g., one predictive model per grouping). The sets of predicted outcomes 136 and the metadata 145 of each iteration of the intermediary predictive model can be stored in memory.

At step 1409, the process 1500 can further include computing and storing a validity metric for each iteration of the intermediary predictive model initialized at step 1409.

According to one embodiment, in the process 1500, step 1409 only includes identifying the top-ranked variables. In one or more embodiments, following identification of the top-ranked variables, the process 1500 can include performing two or more iterations of the process 1300 to generate and train the two or more iterations of the intermediary predictive models. In various embodiments, at step 1303 and/or 1306 of the process 1300, the model service 115 excludes the one or more top-ranked variables (and/or associated input data thereof) from inclusion in the two or more iterations of the intermediary predictive models.

At step 1509B (e.g., which may be substantially similar to step 1509A), the process 1500 includes determining that the two or more iterations of the intermediary predictive models do not exceed a differential validity threshold. The difference between the validity metric of each iteration of the intermediary predictive model and each other iteration of the intermediary predictive model can be computed and compared to a predetermined differential validity threshold. If the computed difference of a pair of validity metrics exceeds the differential validity threshold, the assessment service 124 and/or model service 115 can flag the associated predictive model iterations for further analysis and the process 1500 can proceed to step 1512 (e.g., to recursively revise the intermediary model towards reducing the computed validity difference). If the computed difference of each pair of validity metrics is within the differential validity threshold, the process 1500 can proceed to step 1317. Following step 1317, the process 1500 can proceed to step 1318.

According to one embodiment, the steps 1403-1509B can be performed only with respect to the initialized predictive model that demonstrated a lower validity metric than the validity metric of the compared-to initialized predictive model. In at least one embodiment, the steps 1403-1509B can be performed only with respect to the initialized predictive model that demonstrated a higher validity metric than the validity metric of the compared-to initialized predictive model.

In one or more embodiments, the system 100 can reduce bias in outcomes generated from predictive models. Bias introduction to predictive models can occur if the outcome being predicted is itself biased in some manner, and may sometimes occur even if both the data input and the predicted outcome are unbiased, due to coincidental and unpredictable relationships between complicated combinations or transformations of inputs and an undesirable outcome. According to one embodiment, the system 100 is a novel machine-learning system that revalidates a semi-terminal predictive model for lack of effect in undesirable or illegal areas unrelated to the main predicted outcome, while at the same time parsing the predictive model into discrete units of downstream components (e.g. variable combinations, hidden layers, decision nodes) to identify which of these components are leading to the undesired coincidental outcome from the predictive process. In various embodiments, the system 100 automatically re-runs the initial predictive process, but with logic that enables it to avoid the offending component. Thus, in at least one embodiment, a new model is generated which meets the predictive objectives of the system 100 while not including predictive components that generate a biased outcome. In one or more embodiment, the system 100 repeats the processes recursively until a terminal predictive model is generated which achieves the desired predictive outcome without retaining and undesired or illegal bias.

In one or more embodiments, the system 100 uses a meta process involving a plurality of machine-learning processes to generate analytical models of varied positive outcomes for users in an entity, allowing our system to prepare AI-driven guidance in a variety of key areas (e.g.: who to admit to an entity, where to best to place a user within that entity, what path may best suit the user, what training and learning programs to provide for the user) in such a way as to maximize positive outcomes for users and for the entity.

Although the performance analytics system 100, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9, 10, and 13-15 show the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1215 in a computer system or other system. The machine code may be converted from the source code, etc. If embodied in hardware, each block may represent a circuit or a number of interconnected circuits to implement the specified logical function(s).

Although the flowcharts of FIGS. 9, 10, 13-15 show a specific order of execution, it is understood that the order of execution may differ from that which is displayed. For example, the order of execution of two or more blocks may be scrambled relative to the order shown. Also, two or more blocks shown in succession in FIGS. 9, 10, 13-15 may be executed concurrently or with partial concurrence. Further, in some embodiments, one or more of the blocks shown in FIGS. 9, 10, 13-15 may be skipped or omitted. In addition, any number of counters, state variables, warning semaphores, or messages might be added to the logical flow described herein, for purposes of enhanced utility, tabulation, performance measurement, or providing troubleshooting aids, etc. It is understood that all such variations are within the scope of the present disclosure.

Also, any logic or application described herein, including a performance analytics system 100, that comprises software or code can be embodied in any non-transitory computer-readable medium for use by or in connection with an instruction execution system such as, for example, a processor 1215 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including list of main applications, may be implemented and structured in a variety of ways. For example, one or more applications described may be implemented as modules or components of a single application. Further, one or more applications described herein may be executed in shared or separate computing devices or a combination thereof. For example, the applications described herein may execute in the same computing device 1203, or in multiple computing devices in the same computing environment 1200. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an element, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a memory device; and
at least one hardware processor coupled to the memory device, wherein the at least one hardware processor is configured to at least:
receive a set of input data individually describing a particular asset associated with an entity;
receive a set of inputs individually responsive to a respective subset of a plurality of queries for a particular user;
generate a predictive model based on the set of input data;
calculate a predictive outcome for the particular user by applying the predictive model to the set of inputs;
identify a target score impacting the predictive outcome for the particular user; and
assign a training program to the particular user corresponding to the target score.

2. The system of claim 1, wherein the at least one hardware processor is further configured to identify the target score based on a projected improvement of the target score from the training program.

3. The system of claim 1, wherein the at least one hardware processor is further configured to identify the target score from a specific set of scores based on an effect of individual ones of the specific set of scores on the predictive outcome that represents a fit of the particular user for the particular asset associated with the entity.

4. The system of claim 1, wherein the target score is a target scale score.

5. The system of claim 1, wherein the at least one hardware processor is further configured to receive a request to determine training for the particular user.

6. The system of claim 1, wherein the at least one hardware processor is further configured to receive a plurality of sets of inputs from a plurality of users, wherein the plurality of sets of inputs comprises the set of inputs and the plurality of users comprises the particular user.

7. The system of claim 6, wherein the at least one hardware processor is further configured to:
identify a plurality of respective target scores individually impacting a respective user of the plurality of users; and
assign individual ones of a plurality of training programs to each respective user of the plurality of users based on the plurality of respective target scores.

8. A method, comprising:
receiving, via one or more of at least one hardware processor, a set of input data individually describing a particular asset associated with an entity;
receiving, via one or more of the at least one hardware processor, a set of inputs individually responsive to a respective subset of a plurality of queries for a particular user;
generating, via one or more of the at least one hardware processor, a predictive model based on the set of input data;
calculating, via one or more of the at least one hardware processor, a predictive outcome for the particular user by applying the predictive model to the set of inputs;
identifying, via one or more of the at least one hardware processor, a target score impacting the predictive outcome for the particular user; and assigning, via one or more of the at least one hardware processor, a training program to the particular user corresponding to the target score.

9. The method of claim 8, further comprising receiving a request to identify a threshold quantity of users for the training program.

10. The method of claim 8, wherein the particular asset is a job position.

11. The method of claim 8, further comprising iterating, via one or more of the at least one hardware processor, a plurality of scores for the particular user to identify the target score.

12. The method of claim 11, wherein for each iteration, the method further comprises calculating, via one or more of the at least one hardware processor, a respective theoretical outcome for the particular user if a current iteration score were increased by a particular amount, wherein the target score is selected as the current iteration score which improved the respective theoretical outcome the most.

13. The method of claim 12, wherein the particular amount is determined based on improvements of part participants in at least one program.

14. The method of claim 8, wherein the predictive model comprises a recursive regression.

15. A non-transitory computer-readable medium embodying a program that, when executed by at least one hardware processor, causes the at least one hardware processor to:

receive a set of input data individually describing a particular asset associated with an entity;

receive a set of inputs individually responsive to a respective subset of a plurality of queries for a particular user;

generate a predictive model based on the set of input data;

calculate a predictive outcome for the particular user by applying the predictive model to the set of inputs;

identify a target score impacting the predictive outcome for the particular user; and assign a training program to the particular user corresponding to the target score.

16. The non-transitory computer-readable medium of claim 15, wherein the program further causes the at least one hardware processor to identify the target score as a score corresponding to a greatest coefficient in the predictive model.

17. The non-transitory computer-readable medium of claim 15, wherein the predictive model comprises an artificial intelligence neural network predictive of a desired outcome for the particular asset.

18. The non-transitory computer-readable medium of claim 15, wherein the program further causes the at least one hardware processor to schedule the training program for the entity based on identifying the target score.

19. The non-transitory computer-readable medium of claim 15, wherein the predictive model comprises a plurality of compartmentalized variables.

20. The non-transitory computer-readable medium of claim 15, wherein the program further causes the at least one hardware processor to identify the target score based on a projected improvement of the target score.

* * * * *